(12) United States Patent
Wassvik et al.

(10) Patent No.: US 9,134,854 B2
(45) Date of Patent: Sep. 15, 2015

(54) DETECTING THE LOCATIONS OF A PLURALITY OF OBJECTS ON A TOUCH SURFACE

(75) Inventors: Ola Wassvik, Brösarp (SE); Tomas Christiansson, Torna-Hällestad (SE)

(73) Assignee: FlatFrog Laboratories AB, Lund (SE)

( * ) Notice: Subject to any disclaimer, the term of this patent is extended or adjusted under 35 U.S.C. 154(b) by 838 days.

(21) Appl. No.: 12/737,020

(22) PCT Filed: Jun. 22, 2009

(86) PCT No.: PCT/EP2009/057723
§ 371 (c)(1), (2), (4) Date: Dec. 2, 2010

(87) PCT Pub. No.: WO2010/006882
PCT Pub. Date: Jan. 21, 2010

(65) Prior Publication Data
US 2011/0074735 A1    Mar. 31, 2011

Related U.S. Application Data

(60) Provisional application No. 61/129,373, filed on Jun. 23, 2008.

(30) Foreign Application Priority Data

Jun. 23, 2008  (SE) ...................................... 0801466

(51) Int. Cl.
G06F 3/042    (2006.01)
(52) U.S. Cl.
CPC ............ G06F 3/0421 (2013.01); G06F 3/0423 (2013.01); *G06F 2203/04109* (2013.01)
(58) Field of Classification Search
CPC ................... G06F 2203/04109; G06F 3/0421; G06F 3/042; G06F 3/0423; G06F 3/0428; G06F 2203/04104
USPC ...................... 345/173–178; 178/18.01–20.04
See application file for complete search history.

(56) References Cited

U.S. PATENT DOCUMENTS 3,553,680 A    1/1971    Cooreman
3,673,327 A    6/1972    Johnson et al.
(Continued)

FOREIGN PATENT DOCUMENTS

CN    1940841    4/2007
CN    101075168    11/2007
(Continued)

OTHER PUBLICATIONS

U.S. Office Action dated Aug. 20, 2013, issued in U.S. Appl. No. 12/737,017.
(Continued)

*Primary Examiner* — Hong Zhou
(74) *Attorney, Agent, or Firm* — Harness, Dickey & Pierce

(57) ABSTRACT

An apparatus is controlled to detect locations of a plurality of objects on a touch surface of a panel. An input scanner arrangement introduces at least three beams of radiation into the panel for propagation by internal reflection, and sweeps the beams inside the panel across a sensing area, preferably in at least two different principal directions. At least one radiation detector is arranged to receive the beams from the input scanner arrangement while they are swept across the sensing area. A data processor is connected to the radiation detector(s) and operated to identify the locations based on an attenuation of the beams caused by the objects touching the touch surface within the sensing area, the attenuation being identifiable from an output signal of the radiation detector(s). Each output signal may be further processed to generate a transmission signal, by dividing the output signal by a background signal which represents the output signal without any object on the touch surface.

9 Claims, 21 Drawing Sheets

(56) References Cited

U.S. PATENT DOCUMENTS

| | | |
|---|---|---|
| 4,129,384 A | 12/1978 | Walker et al. |
| 4,213,707 A | 7/1980 | Evans, Jr. |
| 4,294,543 A | 10/1981 | Apple et al. |
| 4,420,261 A | 12/1983 | Barlow et al. |
| 4,507,557 A | 3/1985 | Tsikos |
| 4,521,112 A | 6/1985 | Kuwabara et al. |
| 4,746,770 A | 5/1988 | McAvinney |
| 4,933,544 A | 6/1990 | Tamaru |
| 5,383,022 A | 1/1995 | Kaser |
| 5,570,181 A | 10/1996 | Yasuo et al. |
| 5,764,223 A | 6/1998 | Chang et al. |
| 6,492,633 B2 | 12/2002 | Nakazawa et al. |
| 6,972,753 B1 | 12/2005 | Kimura et al. |
| 7,176,904 B2 | 2/2007 | Satoh |
| 7,629,968 B2 | 12/2009 | Miller et al. |
| 8,218,154 B2 | 7/2012 | Ostergaard et al. |
| 2001/0002694 A1 | 6/2001 | Nakazawa et al. |
| 2002/0067348 A1 | 6/2002 | Masters et al. |
| 2003/0160155 A1 | 8/2003 | Liess |
| 2004/0174541 A1 | 9/2004 | Freifeld |
| 2004/0252091 A1 | 12/2004 | Ma et al. |
| 2005/0128190 A1 | 6/2005 | Ryynanen |
| 2005/0200613 A1 | 9/2005 | Kobayashi et al. |
| 2006/0007185 A1 | 1/2006 | Kobayashi |
| 2006/0017709 A1 | 1/2006 | Okano |
| 2006/0114237 A1 | 6/2006 | Crockett et al. |
| 2006/0139340 A1 | 6/2006 | Geaghan |
| 2006/0227120 A1 | 10/2006 | Eikman |
| 2007/0024598 A1 | 2/2007 | Miller et al. |
| 2007/0052684 A1 | 3/2007 | Gruhlke et al. |
| 2007/0070056 A1 | 3/2007 | Sato et al. |
| 2007/0120833 A1 | 5/2007 | Yamaguchi et al. |
| 2008/0068691 A1 | 3/2008 | Miyatake |
| 2008/0252619 A1 | 10/2008 | Crockett et al. |
| 2009/0073142 A1* | 3/2009 | Yamashita et al. ............ 345/176 |
| 2009/0135162 A1 | 5/2009 | Wijdeven et al. |
| 2009/0219256 A1 | 9/2009 | Newton |
| 2009/0273794 A1 | 11/2009 | Ostergaard et al. |
| 2010/0045629 A1 | 2/2010 | Newton |
| 2010/0066704 A1 | 3/2010 | Kasai |
| 2010/0079407 A1 | 4/2010 | Suggs |
| 2010/0193259 A1 | 8/2010 | Wassvik |

FOREIGN PATENT DOCUMENTS

| | | |
|---|---|---|
| EP | 0 897 161 | 2/1999 |
| EP | 1 752 864 | 2/2007 |
| GB | 2 131 544 | 6/1984 |
| JP | 02-155023 | 6/1990 |
| JP | 2005-346503 | 12/2005 |
| JP | 2007-128497 | 5/2007 |
| RU | 2072513 | 1/1997 |
| WO | WO 01/84251 | 11/2001 |
| WO | WO 2006/095320 | 9/2006 |
| WO | WO 2007/112742 | 10/2007 |
| WO | WO 2008/039006 | 4/2008 |
| WO | WO 2008/066004 | 6/2008 |
| WO | WO 2008/068607 | 6/2008 |
| WO | WO 2009/048365 | 4/2009 |
| WO | WO 2010/006883 | 1/2010 |
| WO | WO 2010/006884 | 1/2010 |
| WO | WO 2010/006885 | 1/2010 |

OTHER PUBLICATIONS

U.S. Office Action issued Apr. 2, 2012 in U.S. Appl. No. 12/737,019.
U.S. Office Action issued Apr. 24, 2012 in U.S. Appl. No. 12/737,018.
U.S. Office Action issued Aug. 24, 2012 in U.S. Appl. No. 12/737,016.
U.S. Office Action dated Feb. 11, 2013, issued in U.S. Appl. No. 12/737,017.
English Translation of Chinese Search Report issued in Chinese Application No. 2009801237168.
English Translation of Chinese Search Report issued in Chinese Application No. 2009801237172.
Notice of Allowance dated Feb. 22, 2013, issued in U.S. Appl. No. 12/737,016.
U.S. Office Action dated Feb. 27, 2013 issued in U.S. Appl. No. 12/737,018.
U.S. Office Action dated Feb. 28, 2013 issued in U.S. Appl. No. 12/737,019.
Chinese Office Action dated Sep. 3, 2013 issued in Chinese Application No. 200980123717.2.
Russian Office Action dated Jul. 12, 2013 issued in Russian Application No. 2010151557/08 and English translation thereof.
Japanese Office Action dated Sep. 3, 2013 issued in corresponding Japanese Application No. 2011-514058 and English translation thereof.
Liu J., et al., "Multiple touch points identifying method, involves starting touch screen, driving specific emission tube, and computing and transmitting coordinate of touch points to computer system by direct lines through interface of touch screen", vol. 2008, No. 28, Nov. 21, 2007.
International Search Report dated Jan. 4, 2011 for International application No. PCT/EP2009/057731.
International Search Report dated Oct. 7, 2011 for International application No. PCT/EP2009/057725.
International Search Report dated Oct. 15, 2010 for International application No. PCT/EP2009/057724.
International Search Report dated Oct. 7, 2010 for International application No. PCT/EP2009/057728.
International Search Report dated Feb. 11, 2010 for International application No. PCT/EP2009/057723.
U.S. Notice of Allowance issued in U.S. Appl. No. 12/737,018, dated Aug. 29, 2014.

* cited by examiner

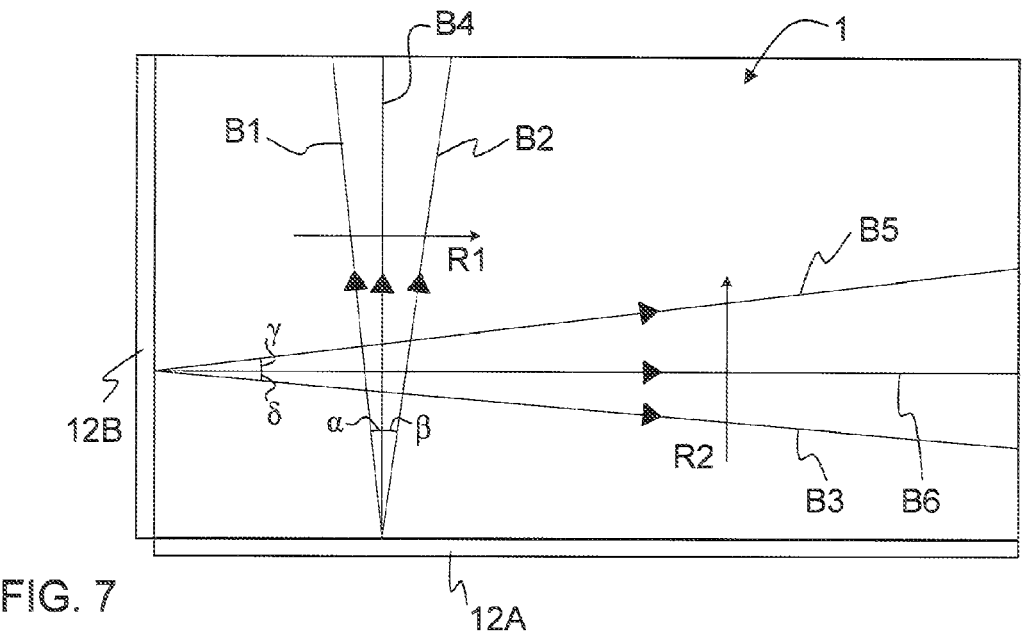
FIG. 7
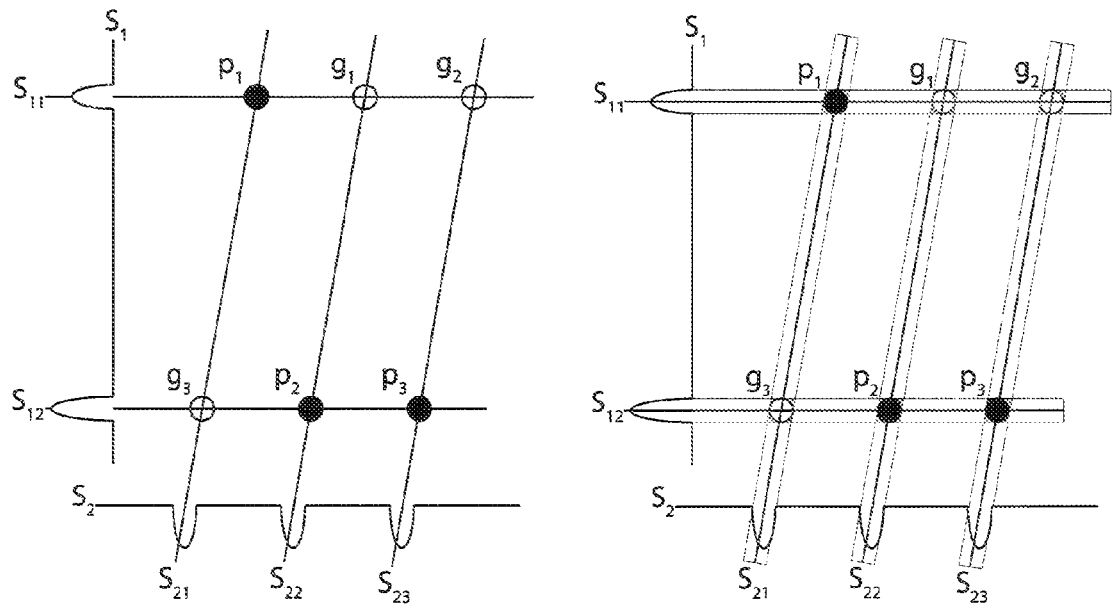
FIG. 8A
FIG. 8B

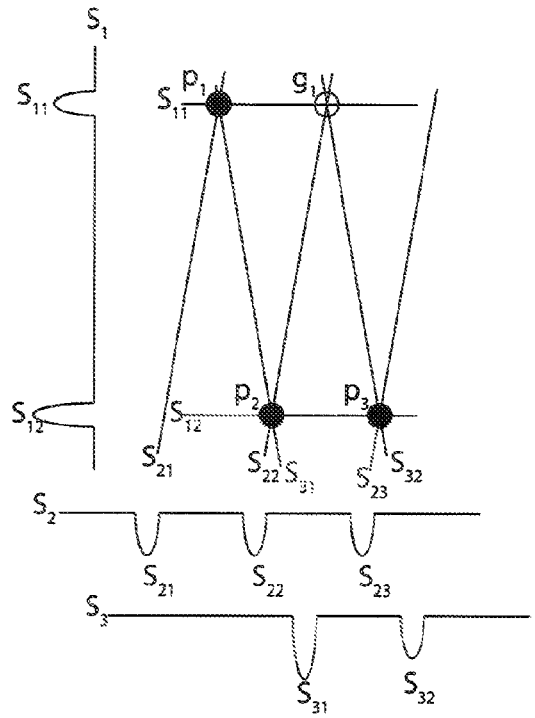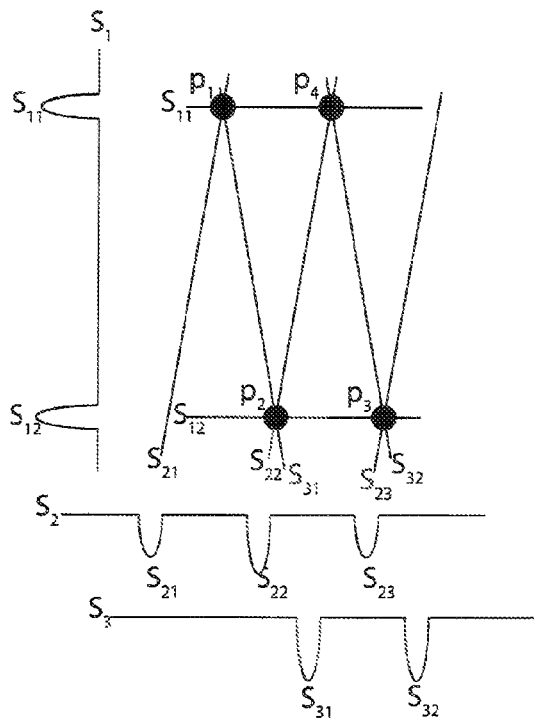
FIG. 9A   FIG. 9B
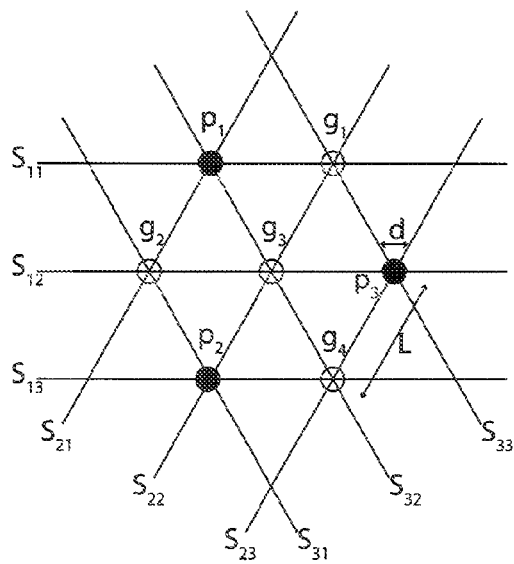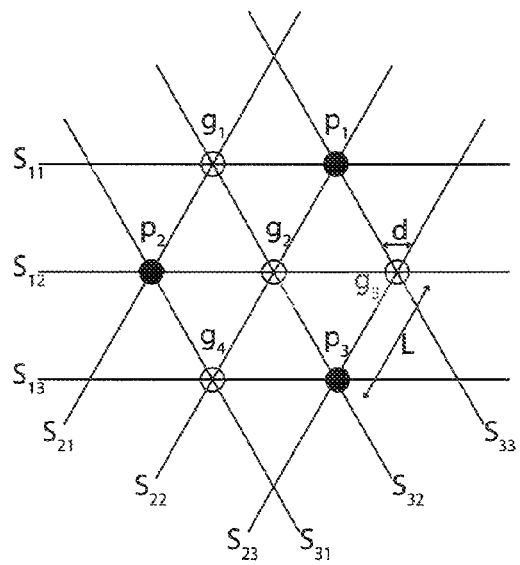
FIG. 10A   FIG. 10B

DETECTING THE LOCATIONS OF A PLURALITY OF OBJECTS ON A TOUCH SURFACE

CROSS-REFERENCE TO RELATED APPLICATIONS

The present application claims the benefit of Swedish patent application No. 0801466-4, filed on Jun. 23, 2008, and U.S. provisional application No. 61/129,373, filed on Jun. 23, 2008, both of which are incorporated herein by reference.

TECHNICAL FIELD

The present invention relates to techniques for detecting the locations of a plurality of objects on a touch surface. The touch surface may be part of a touch-sensitive panel.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light from two spaced-apart light sources is coupled into a panel to propagate inside the panel by total internal reflection. The light from each light source is evenly distributed throughout the entire panel. Arrays of light sensors are located around the perimeter of the panel to detect the light from the light sources. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar technique in which arrays of light beam transmitters are placed along two edges of a panel to set up a grid of intersecting light beams that propagate through the panel by internal reflection. Corresponding arrays of beam detectors are placed at the opposite edges of the panel. When an object touches a surface of the panel, the beams that intersect at the point of touch will be attenuated. The attenuated beams on the arrays of detectors directly identify the location of the object.

These known FTIR techniques suffer from being costly, i.a. since they require the use of a large number of detectors, and possibly a large number of light sources. Furthermore, they are not readily scalable since the required number of detectors/sources increases significantly with the surface area of the panel. Also, the spatial resolution of the panel is dependent on the number of detectors/sources. Still further, the energy consumption for illuminating the panel may be considerable and increases significantly with increasing surface area of the panel.

There is also a need for an improved technique for detecting locations of a plurality of touching objects.

SUMMARY OF THE INVENTION

It is an object of the invention to at least partly overcome one or more of the above-identified limitations of the prior art.

This and other objects, which will appear from the description below, are at least partly achieved by means of apparatus, methods and computer program products according to the independent claims, embodiments thereof being defined by the dependent claims.

A first aspect of the invention is an apparatus for detecting locations of a plurality of objects on a touch surface, said apparatus comprising: a panel defining the touch surface and an opposite surface; an input scanner arrangement adapted to introduce at least three beams of radiation into the panel, such that each beam propagates by internal reflection between the touch surface and the opposite surface in a respective main direction, and to sweep each beam along the surface across a sensing area of the panel; at least one radiation detector configured to receive the beams from the input scanner arrangement while they are swept across the sensing area; and a data processor connected to said at least one radiation detector and configured to identify said locations based on an attenuation of said beams caused by the objects touching the touch surface within said sensing area, said attenuation being identifiable from an output signal of the radiation detector.

In one embodiment, at least part of the sensing area is swept by a first set of mutually acute first beams, wherein the first beams have a maximum mutual acute angle of ≤30°, and preferably ≤20°.

The first beams may be swept in a first principal direction across the panel, and at least one second beam may be swept in a second principal direction across the panel. The second principal direction is non-parallel with the first principal direction, and preferably orthogonal to the first principal direction.

In one embodiment, the panel is rectangular, and the first and second principal directions are parallel to a respective side of the panel.

In one embodiment, said at least one second beam is included in a second set of mutually acute second beams, wherein the second beams are swept in the second principal direction and have a maximum mutual acute angle of ≤30°, and preferably ≤20°.

In one embodiment, the first set comprises two first beams and/or the second set comprises two second beams. In another embodiment, the first set comprises three first beams and/or the second set comprises three second beams.

In one embodiment, the main direction of one of the first beams in the first set is orthogonal to the first principal direction and/or the main direction of one of the second beams in the second set is orthogonal to the second principal direction.

In one embodiment, each pair of second beams has a unique mutual acute angle within the second set and/or each pair of first beams has a unique mutual acute angle within the first set.

In one embodiment, the main directions of said at least three beams are mutually acute, in least part of the sensing area, wherein each pair of said beams define a unique mutual acute angle.

In one embodiment, the main directions of said at least three beams are equiangular in at least part of the sensing area.

In one embodiment, the input scanner arrangement is configured to sweep the beams by translating each beam across the sensing area.

In one embodiment, the input scanner arrangement is configured to sweep the beams across the sensing area with essentially constant mutual angles between the main directions of the beams. For example, each beam may have an essentially invariant main direction while it is swept across the sensing area.

In one embodiment, the panel is defined by linear periphery portions, and each beam is translated in a respective principal direction which is essentially parallel to one of said linear periphery portions.

In one embodiment, the apparatus further comprises an output scanner arrangement which is synchronized with the input scanner arrangement so as to receive the beams from the input scanner arrangement while they are swept across the sensing area and to direct the beams onto at least one radiation detector. For example, the input and output scanner arrangements may be configured to introduce and receive each beam on opposite sides of the sensing area. Alternatively, the apparatus may comprise a reflector, which is arranged along at least part of the periphery of the panel and is configured to receive the beams from the panel and reflect them back into the panel, and wherein the input and output scanner arrangements may be configured to introduce and receive each beam from the same side of the sensing area. The reflector may be a retro-reflecting device.

In an alternative embodiment, the radiation detector comprises a plurality of radiation-sensing elements that are arranged along at least part of the periphery of the panel.

In one embodiment, the data processor is further configured to: obtain at least two output signals from said at least one radiation detector; generate at least two transmission signals by dividing said at least two output signals by a background signal; and identify said attenuation as peaks in said at least two transmission signals.

A second aspect of the invention is an apparatus for detecting locations of a plurality of objects on a touch surface, said touch surface being part of a panel that defines the touch surface and an opposite surface, said apparatus comprising: means for introducing at least three beams of radiation into the panel, said beams propagating by internal reflection between the touch surface and the opposite surface; means for sweeping the beams along the touch surface across a sensing area of the panel; means for receiving the beams on at least one radiation detector while they are swept across the sensing area; and means for identifying said locations based on an attenuation of said beams caused by the objects touching the touch surface within said sensing area, said attenuation being identifiable from an output signal of the radiation detector.

A third aspect of the invention is a method of detecting locations of a plurality of objects on a touch surface, said method comprising: introducing at least three beams of radiation into a panel that defines the touch surface and an opposite surface, said beams propagating by internal reflection between the touch surface and the opposite surface; sweeping the beams along the touch surface across a sensing area of the panel; receiving the beams on at least one radiation detector while they are swept across the sensing area; and identifying said locations based on an attenuation of said beams caused by the objects touching the touch surface within said sensing area, said attenuation being identifiable from an output signal of the radiation detector.

A fourth aspect of the invention is a method of operating an apparatus for detecting locations of a plurality of objects on a touch surface, said touch surface being part of a panel that defines the touch surface and an opposite surface, said method comprising: operating an input scanner arrangement to introduce at least three beams of radiation into the panel, such that each beam propagates by internal reflection between the touch surface and the opposite surface in a respective main direction, and to sweep each beam along the surface across a sensing area of the panel; operating at least one radiation detector to receive the beams from the input scanner arrangement while they are swept across the sensing area; and identifying said locations based on an attenuation of said beams caused by the objects touching the touch surface within said sensing area, said attenuation being identifiable from an output signal of the radiation detector.

A fifth aspect of the invention is a computer program product comprising computer code which, when executed on a data-processing system, is adapted to carry out the method of the fourth aspect.

Any one of the embodiments of the first aspect can be combined with the second to fifth aspects.

A sixth aspect of the invention is a method for detecting a location of at least one object on a touch surface on a radiation transmissive panel, said method comprising the steps of: obtaining at least two output signals from a detection arrangement which is optically coupled to one or more elongate outcoupling sites on said panel, said at least two output signals representing a respective spatial distribution of radiation along said one or more outcoupling sites; generating at least two transmission signals, wherein said step of generating comprises dividing said at least two output signals by a background signal; and identifying said location based on peaks in said at least two transmission signals.

In one embodiment, the step of identifying comprises identifying a radiation path for each peak in said at least two transmission signals, and identifying intersection points for the thus-identified radiation paths. The step of identifying may further comprise calculating the integrated area under each peak in said at least two transmission signals, and solving an equation system that relates each integrated area to at least one of said intersection points.

In one embodiment, the step of generating further comprises operating a logarithmic function on the result of said dividing.

In one embodiment, the background signal represents the spatial distribution of radiation along said one or more outcoupling sites without said at least one object on the touch surface.

In one embodiment, the background signal is pre-set, derived during a separate calibration step, or derived from one or more preceding output signals.

In one embodiment, each spatial distribution originates from a respective beam of radiation, which is introduced into the panel to propagate by internal reflection between the touch surface and an opposite surface of the panel in a respective main direction, such that each beam is received at said one or more outcoupling sites.

A seventh aspect of the invention is a computer program product comprising computer code which, when executed on a data-processing system, is adapted to carry out the method of the sixth aspect.

An eighth aspect is a device for detecting a location of at least one object on a touch surface on a radiation transmissive panel, said device comprising: means for obtaining at least two output signals from a detection arrangement which is optically coupled to one or more elongate outcoupling sites on said panel, said at least two output signals representing a respective spatial distribution of radiation along said one or more outcoupling sites; means for generating at least two transmission signals, wherein said generating comprises dividing said at least two output signals by a background signal; and means for identifying said locations based on peaks in said at least two transmission signals.

Any one of the embodiments of the sixth aspect can be combined with the seventh and eighth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 7 is a top plan view of a single-pass system with a dual Ψ-scan beam arrangement.

FIGS. 8A-8B illustrates a set of touch points and resulting ghost points in an exemplifying two-beam arrangement.

FIGS. 9A-9B illustrates a set of touch points and resulting ghost points in an exemplifying three-beam arrangement.

FIGS. 10A-10B illustrates combinations of touch points that result in a degeneration of an equiangular 3-beam arrangement.

DETAILED DESCRIPTION OF EXAMPLE EMBODIMENTS

Figure 1A:
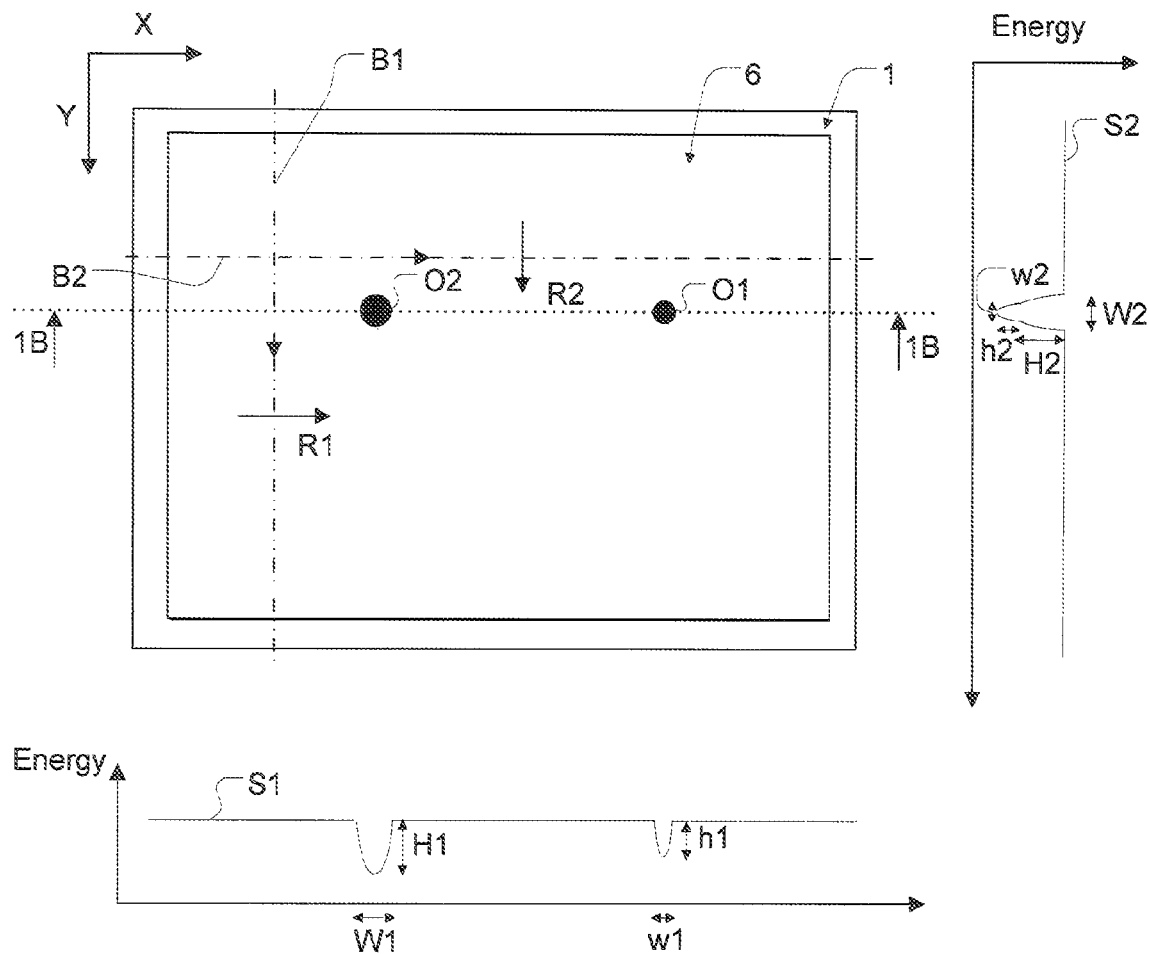
FIG. 1A is a top plan view of a simplified embodiment of a touch-sensing system, and includes graphs of measurement signals generated in the system.

The present invention relates to techniques for detecting locations of a plurality of points-of-touch on a surface of a radiation transmissive panel. For ease of understanding, some underlying principles will first be discussed in relation to a simplified example, before describing exemplifying beam arrangements for multi-touch detection. Then, examples of system configurations are given, followed by a number of detailed implementation examples in relation to one such system configuration. The description is concluded by a data processing example. Throughout the description, the same reference numerals are used to identify corresponding elements.

General

Figure 1B:
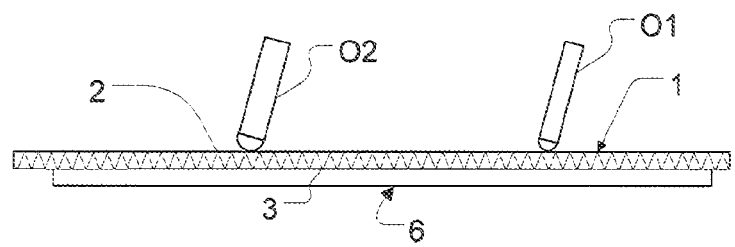
FIG. 1B is a section view of the system in FIG. 1A.

An example of a touch-sensing system including a radiation-transmissive panel 1 is shown in the top plan view of FIG. 1A and the section view of FIG. 1B (taken along line 1B-1B in FIG. 1A). The panel 1 defines two opposite and generally parallel surfaces 2, 3 and may be planar or curved. The panel 1 is configured to allow radiation to propagate inside the panel by internal reflection. To this end, a radiation propagation channel is provided between two boundary surfaces of the panel, wherein at least one of the boundary surfaces allows the propagating radiation to interact with one or more touching objects (two objects O1, O2 shown). In the interaction with each object, part of the radiation may be scattered by the object, part of the radiation may be absorbed by the object, and part of the radiation may continue to propagate unaffected. Thus, when the object O1, O2 touches a touch surface of the panel 1 (e.g. the top surface 2), the energy of the transmitted radiation is decreased. By measuring the energy of the radiation transmitted through the panel 1 from a plurality of different directions, the location of the touching object ("touch location") may be detected, e.g. by triangulation.

In the example of FIG. 1, the system also includes an interface device 6 that provides a graphical user interface (GUI) within at least part of the panel surface. The interface device 6 may be in the form of a substrate with a fixed image that is arranged over, under or within the panel 1. Alternatively, the interface device 6 may be a screen arranged underneath or inside the system, or a projector arranged underneath or above the system to project an image onto the panel 1. Such an interface device 6 may provide a dynamic GUI, similar to the GUI provided by a computer screen.

Figure 22A:
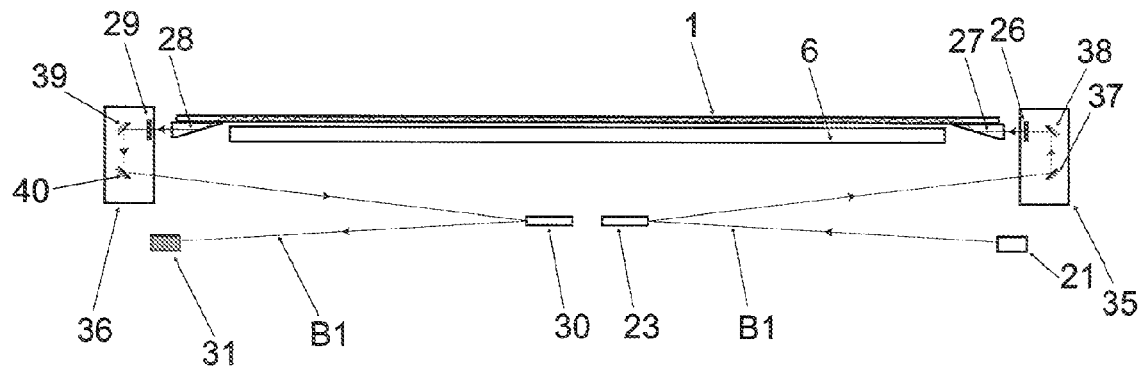
FIGS. 22A-22B are elevated side and top plan views, respectively, of an embodiment with folded beam paths.

Typically, the panel 1 is made of solid material, in one or more layers. The internal reflections in the touch surface 2 are caused by total internal reflection (TIR), resulting from a difference in refractive index between the material of the panel and the surrounding medium, typically air. The reflections in the opposite boundary surface 3 may be caused either by TIR or by a reflective coating applied to the opposite boundary surface. The total internal reflection is sustained as long as the radiation is injected into the panel 1 at an angle to the normal of the panel which is larger than the critical angle at the injection site of the panel. The critical angle is governed by the refractive indices of the material receiving the radiation at the injection site and the surrounding material, as is well-known to the skilled person. The above-mentioned process of interaction between the touching object and the propagating radiation may involve so-called frustrated total internal reflection (FTIR), in which energy is dissipated into the object from an evanescent wave formed by the propagating radiation, provided that the object has a higher refractive index than the material surrounding the panel surface material and is placed within less than several wavelengths distance from the surface 2. Generally, the panel may be made of any material that transmits a sufficient amount of radiation in the relevant wavelength range to permit a sensible measurement of transmitted energy. Such material includes glass, poly (methyl methacrylate) (PMMA) and polycarbinates (PC). The panel is defined by a circumferential edge portion, which may or may not be perpendicular to the top and bottom surfaces 2, 3. The radiation may be coupled into and out of the panel directly via the edge portion. Alternatively, a separate elongate coupling element may be attached to the edge portion or to the top or bottom surface 2, 3 to lead the radiation into or out of the panel. Such a coupling element may have the shape of a wedge (e.g. as shown in FIG. 22A).

As shown in FIG. 1A, radiation is introduced into the panel 1 in the form of a number of non-parallel beams B1, B2. Each beam B1, B2 is swept or scanned along an incoupling site on the panel 1 and across the panel 1 by an input scanner arrangement (not shown). In the illustrated example, elongate incoupling sites are located at the left and top edges of the panel 1. The transmitted energy at an outcoupling site on the panel is measured by a detection arrangement (not shown) which is arranged to receive the respective beam B1, B2 as it is swept across the panel 1. In the illustrated example, elongate outcoupling sites are located at the right and bottom edges of the panel 1.

In the context of the present application, a "sensing instance" is formed when all beams has been swept once across the panel. The beams may be swept sequentially across the panel within a sensing instance. Alternatively, two or more beams may be swept wholly or partly simultaneously across the panel during a sensing instance. Preferably, each beam is swept in a continuous movement across the panel.

The temporal resolution of the system is determined by the update frequency, which is the frequency of sensing instances. For example, for a system designed for recording of handwriting, it may be desirable to have an update frequency of at least 75 Hz, whereas other applications may require a lower or higher temporal resolution.

Generally, the input scanner arrangement can operate in any suitable wavelength range, e.g. in the infrared or visible wavelength region. All beams could be generated with identical wavelength. Alternatively, different beams could be generated with radiation in different wavelength ranges, permitting differentiation between the beams based on wavelength. Furthermore, the input scanner arrangement can output either continuous or pulsed radiation.

The beams could be generated by one or more radiation sources, which can be any type of device capable of emitting radiation in a desired wavelength range, for example a diode laser, a VCSEL (vertical-cavity surface-emitting laser), or alternatively an LED (light-emitting diode), an incandescent lamp, a halogen lamp, etc.

As mentioned above, the location of a touching object O1, O2 can be determined if the object O1, O2 affects at least two non-parallel beams B1, B2 while these are swept across the panel. Each beam B1, B2 is preferably narrow in its sweep direction R1, R2 and wide perpendicularly thereto, i.e. in the depth direction of the panel. After passing the panel at least once, the energy of each beam B1, B2 is measured by at least one radiation detector (not shown), which is optically coupled to the outcoupling site(s) on the panel 1.

The energy of the beams may be measured by any type of radiation detector capable of converting radiation into an electrical signal. Such a radiation detector may have any number of radiation-sensitive elements and may thus be a 0-dimensional, 1-dimensional (1D) or 2-dimensional (2D) detector. One detector may be used to measure the energy of a single beam, or the individual energy of plural beams. In certain embodiments, the detector may be a photo detector with only one radiation-sensitive element, which may have a large detection surface, resulting in low detection noise. Furthermore, photo detectors are presently cheap in comparison with other detectors. In another variant, a 0- or 1-dimensional detector is formed by appropriate binning of the radiation-sensitive elements (pixels) of a two-dimensional detector such as a CMOS sensor.

Generally, by using an input scanner arrangement for sweeping beams across the panel, only a small number of radiation sources are required to detect the location of an object on the surface of the panel. Furthermore, the number of radiation sources is not dependent on the surface area of the panel, and thus the touch-sensing system is readily scalable.

Compared to prior art techniques with constant illumination of the entire panel, the use of an input scanner arrangement allows for a lower power consumption for a given signal-to-noise ratio since only a small part of the panel is illuminated at a time.

Furthermore, the spatial resolution of the touch-sensing system is given by the sampling rate, i.e. the rate at which measurement data is sampled from each radiation detector. This means that any desired resolution can be achieved, provided that sufficient amount of radiation is introduced into the panel. Furthermore, the spatial resolution can be varied during operation of the touch-sensing system, and different spatial resolution can be achieved in different parts of the panel.

The touch-sensing system of FIG. 1 may be operated to determine the location of a plurality of objects touching the surface during a sensing instance ("multitouch"). As mentioned above, only part of the radiation is absorbed/scattered by an object, while the remaining radiation continues to propagate along the main direction of the beam. Thus, if two objects happen to be placed after each other in the main direction of a beam, part of the beam will interact with both objects. Provided that the beam energy is sufficient, a remainder the beam will reach the radiation detector and generate a measurement signal that allows both interactions to be identified. In FIG. 1A, two objects O1, O2 are placed simultaneously (i.e. during one and the same sensing instance) on the panel 1, and measurement signals S1, S2 are generated by the radiation detector(s). The signals S1, S2 represent the measured energy of beams B1, B2 during a sweep. The signals may indicate measured energy as a function of time, sweep angle or X/Y position in a given coordinate system with respect to the panel 1. As shown, each touching object O1 results in a local decrease in measured beam energy for each sweep. Specifically, object O1 is attributed to signal features w1 and h1 in signal S1 and signal features w2 and h2 in signal S2, whereas object O2 is attributed to signal features W1 and H1 in signal S1 and signal features W2 and H2 in signal S2. Signal features w1, w2, W1, W2 (width features) depend on the apparent size of the objects O1, O2. Signal features h1, h2, H1, H2 (energy features) depend on the absorptive/scattering properties of the objects O1, O2 as well as the size of the objects. Provided that the signals S1, S2 allow a data processor (not shown) to distinguish between the objects, their location on the panel can be determined.

Although it may be possible to determine a plurality of touch locations in the system of FIG. 1, there is a need for an improved technique that is less reliant on the ability to separate overlapping signal patterns in the measurement signals.

It has been found that such an improved technique is achieved by sweeping at least three beams across the panel, such that they are non-coincident within at least part of the surface area of the panel. This part of the surface area, which is swept by at least three non-coincident beams, forms a multi-touch sensing area (also denoted "sensing area" in the following).

As will be further described in the following, the system may be configured with different beam arrangements within the panel depending on the desired characteristics of the system, e.g. with respect to the precision in detecting touch locations, the number of touch locations that can be detected within a sensing instance, the technical complexity of the system, the footprint of the system, the relative size of the multi-touch sensing area to the total surface area of the panel, etc.

In relation to the beam arrangements disclosed in the following, it is to be understood that the beams do not physically intersect over the entire panel. Instead, the points of intersection between beams can be reconstructed when each of the beams has been swept across the panel.

Furthermore, it is to be understood that the following discussion about beam directions refers to the main direction of each beam, which is a straight symmetry line that extends in the panel from the beam injection site, as seen in a planar view of the panel.

Still further, in the context of the present application, a "sweep direction" refers to a principal direction that includes a certain direction (R) and its opposite direction (−R).

In FIGS. 1-5, a Cartesian coordinate system has been introduced, with the coordinate axes X,Y being parallel to the sides of the rectangular panel. This is only for the purpose of illustration, and the touch locations can be represented in any type of coordinate system, e.g. polar, elliptic, parabolic, etc.
Exemplifying Beam Arrangements FIGS. 2A-2D illustrate an embodiment in which three beams B1-B3 are swept across the panel. FIG. 2A shows that two beams B1, B2 are translated in a first sweep direction R1, and a third beam B3 is translated in a second sweep direction R2 which is perpendicular to the first sweep direction. The main directions of beams B1, B2 define a respective angle $\alpha 1$, $\alpha 2$ to the normal N of the first sweep direction R1 (FIG. 2C), and the main direction of beam B3 is perpendicular to the second sweep direction R2. This type of beam arrangement with two non-parallel beams B1, B2 that are translated in one sweep direction R1 across the panel is denoted "v-scan" in the following. In the illustrated embodiment, as well as in all other embodiments, the beams B1, B2 may be introduced from opposite sides of the panel or on the same side.

In the illustrated example, the first and second sweep directions R1, R2 are parallel to the sides of the panel. This has been found to facilitate the design of the system. For example, as will be described in detail below, an elongate beam-directing element may be arranged along the side of the system to define the main beam direction in the panel as a beam is swept along the beam-directing element. Thus, for a panel that is defined by linear periphery portions (sides), it may generally be desirable for each sweep direction to be essentially parallel to a respective periphery portion.

Figure 2A:
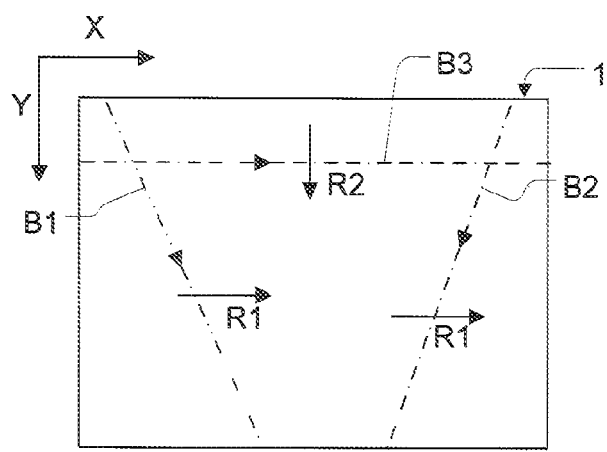
FIGS. 2A-2D are top plan views of yet another embodiment, with FIG. 2A illustrating beam sweeps, FIG. 2B illustrating the location of different sensing portions, FIG. 2C illustrating the definition of mutual beam angles, and FIG. 2D illustrating an equiangular beam arrangement.
Figure 2B:
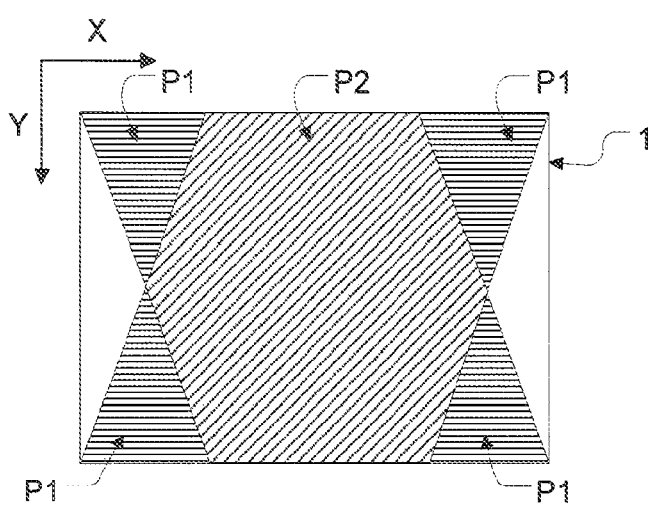
Figure 2C:
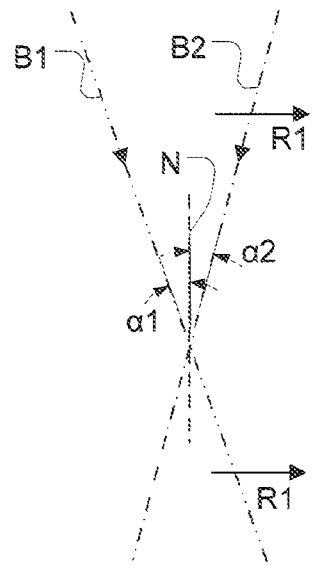

In FIG. 2A, the beams B1-B3 form a v-scan in the X direction and a single scan in the Y direction. With this beam arrangement, the panel will be divided into sub-portions P1, P2 that are swept by different number of beams, as shown in FIG. 2B. Thus, the panel 1 comprises a number of first sub-portions P1, in which each point of intersection is formed by two beams, and a central second sub-portion P2, in which each point of intersection is formed by three beams. Thus, the second sub-portion P2 defines the multi-touch sensing area of the system.

Figure 2D:
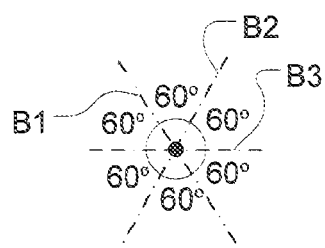

In FIG. 2B, the beams B1-B3 are essentially equiangular within the second sub-portion P2. Such a beam arrangement maximizes the mutual angle between the beams. A large mutual angle may improve the precision of the detected touch locations, at least in some implementations. By "equiangular beams" is meant that, in each point of intersection, the main directions of the beams are equally distributed over 360°. In this example, as shown in FIG. 2D, the beams intersect with a mutual angle of 60° ($\alpha 1 = \alpha 2 = 30°$).

Although it may be desirable for the beams to be equiangular within the sensing area, such a beam arrangement may restrict the sensing area to the central portion of the panel (cf. sub-portion P2), whereas the remainder of the total panel surface is wasted. Thus, the footprint of the touch-sensing system may become excessive in relation to the size of the sensing area.

Figure 3A:
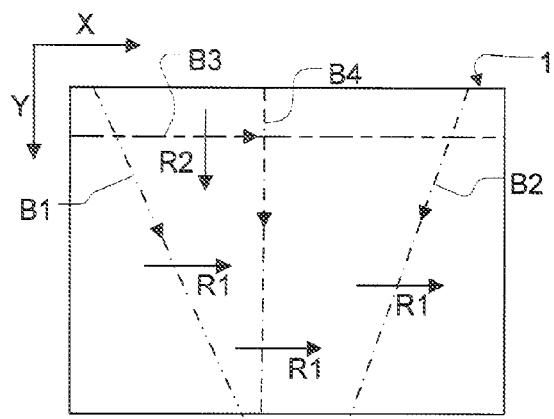
FIGS. 3A-3B are top plan views of still another embodiment, with FIG. 3A illustrating beam sweeps and FIG. 3B illustrating the location of different sensing portions.
Figure 3B:
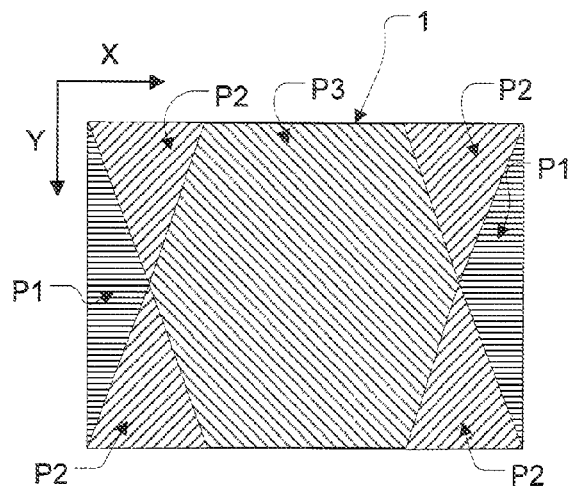

FIG. 3A illustrates a variant of the embodiment in FIG. 2A, in which one further beam B4 is additionally swept in the X direction. In the illustrated example, this beam is orthogonal to its sweep direction R1, and thus parallel to a pair of opposite sides of the panel. As shown in FIG. 3B, the panel is divided into two first sub-portions P1, in which each intersection point is formed by two beams, and four adjacent second sub-portions P2, in which each intersection point is formed by three beams, as well as a central third sub-portion P3, in which each intersection point is formed by four beams. In this embodiment, the equiangular beams B1-B3 are supplemented by an additional beam B4 in order to expand the extent of the multi-touch sensing area, which comprises sub-portions P2 and P3. This expansion is achieved by sweeping a combination of a v-scan (B1 and B2) with an orthogonal beam (B4) in one direction R1 across the panel. This combination of beams is denoted "Ψ-scan" in the following.

Although the multi-touch sensing area has been expanded, this sensing area now contains different sub-portions P2, P3. Potentially, the performance differs between these sub-portions P2, P3, e.g. in terms of the precision that can be attained in the determination of touch locations, as well as the number of simultaneous touches that can be discriminated. The overall performance of the system may be improved further by increasing the number of beams that are swept across the panel, but increasing the number of beams will also increase the number of different sub-portions within the sensing area. Thus, differences in performance may prevail across the panel. Furthermore, it may be desirable to avoid sweeping more than about 6-10 beams across the panel. As the number of beams increases, so does the cost, the technical complexity and possibly the footprint of the system. Furthermore, since the sampling rate of the processing system is normally constant at a certain price point, increasing the number of beams will decrease the number of samples per beam sweep. It is also possible that the measured signal level for each sample decreases with an increased number of beams.

Figure 4A:
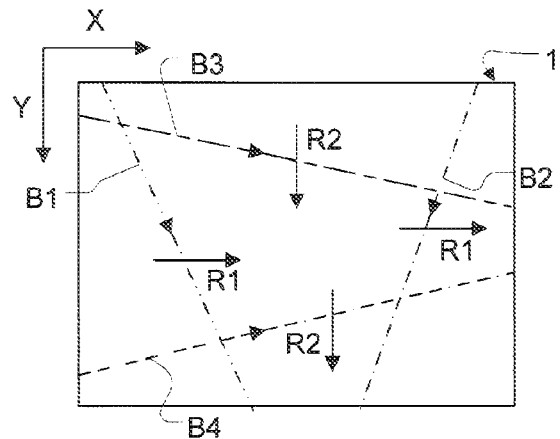
FIG. 4A is a variant of the embodiment in FIG. 2.
Figure 4B:
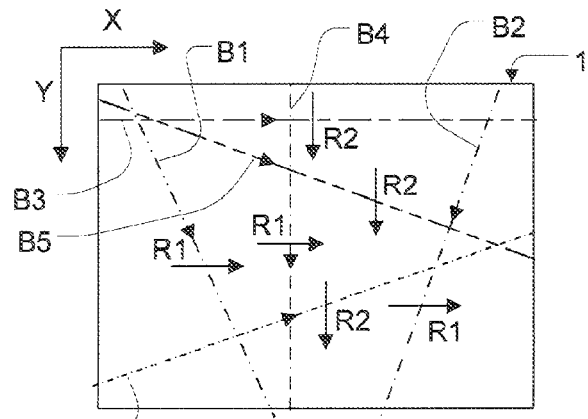
FIG. 4B is a variant of the embodiment in FIG. 3.

FIG. 4A illustrates a variant of FIG. 2, wherein each of the X and Y directions is swept by two mutually non-parallel beams, i.e. a v-scan, and FIG. 4B illustrates a variant of the embodiment in FIG. 3, wherein each of the X and Y directions is swept by two mutually non-parallel beams and an orthogonal beam, i.e. a Ψ-scan.

Figure 5:
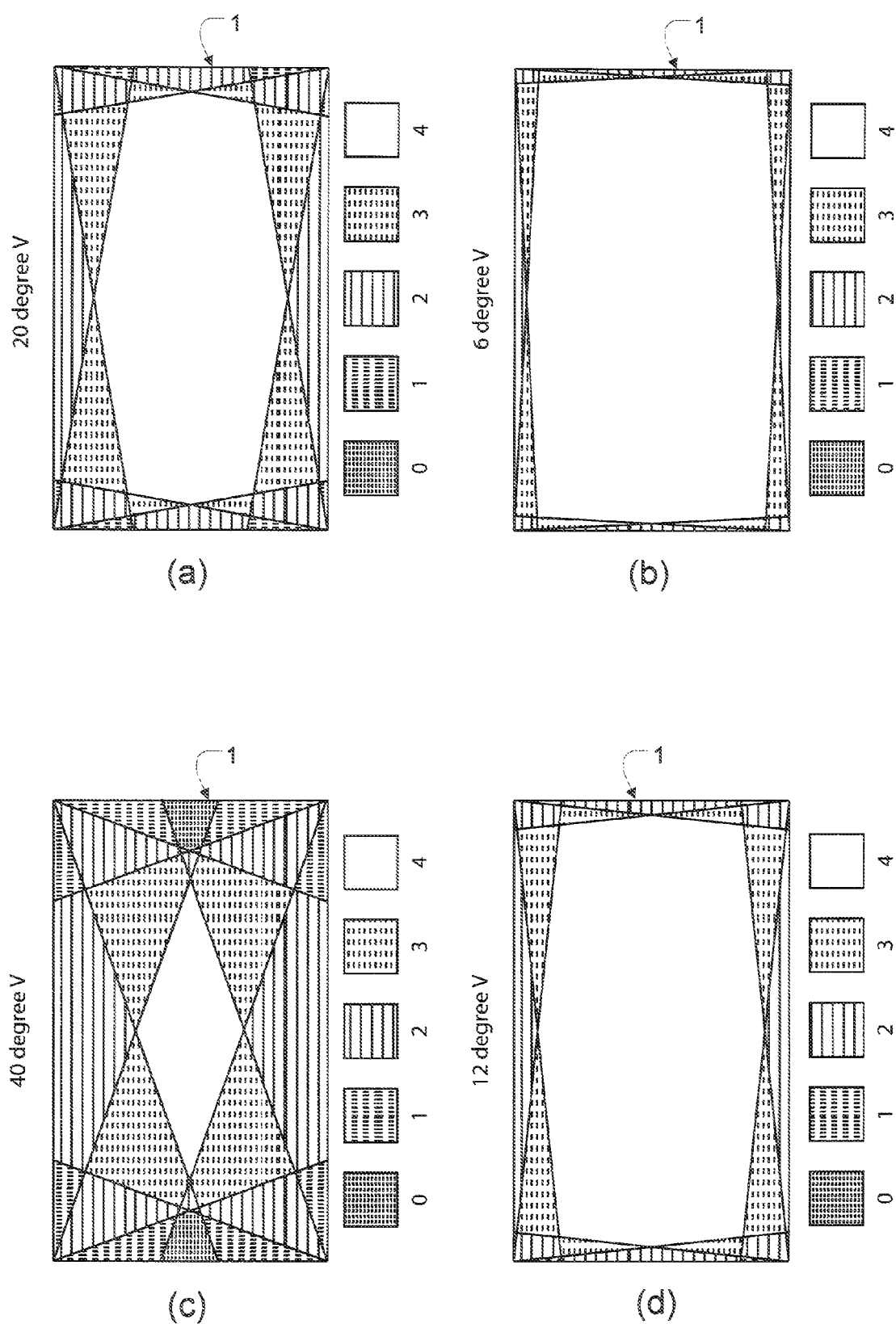
FIGS. 5A-5D illustrates the location of different sensing portions in an embodiment with a dual v-scan beam arrangement for mutual beam angles of 6°, 12°, 20° and 40°.

FIG. 5 illustrates the location of different sub-portions on a rectangular panel swept by four beams in the dual v-scan arrangement shown in FIG. 4A. Specifically, FIG. 5 shows how the extent and location of these sub-portions changes when a different mutual angle is set up between the beams in each v-scan (i.e. the acute angle between beams B1 and B2, and between beams B3 and B4, respectively in FIG. 4A). At a mutual acute beam angle of about 20° (FIG. 5(a)), a major part of the panel is swept by four beams. Thus, the performance of the system is the same over a large part of the panel. Reducing the mutual beam angle further, increases the extent of the central sub-portion and decreases the size of the other sub-portions. At an angle of about 12°-15° (cf. FIG. 5(d)), there are essentially no sub-portions that are swept by less than two beams, and thus the entire panel is touch sensitive. At an angle of about 2°-8° (cf. FIG. 5(b)), the entire panel can be considered to present an essentially uniform performance. Although the performance of the system is reduced as the mutual acute angle is decreased, it has been found that adequate performance can be achieved at mutual acute angles from about 2° up to about 30°.

Figure 6:
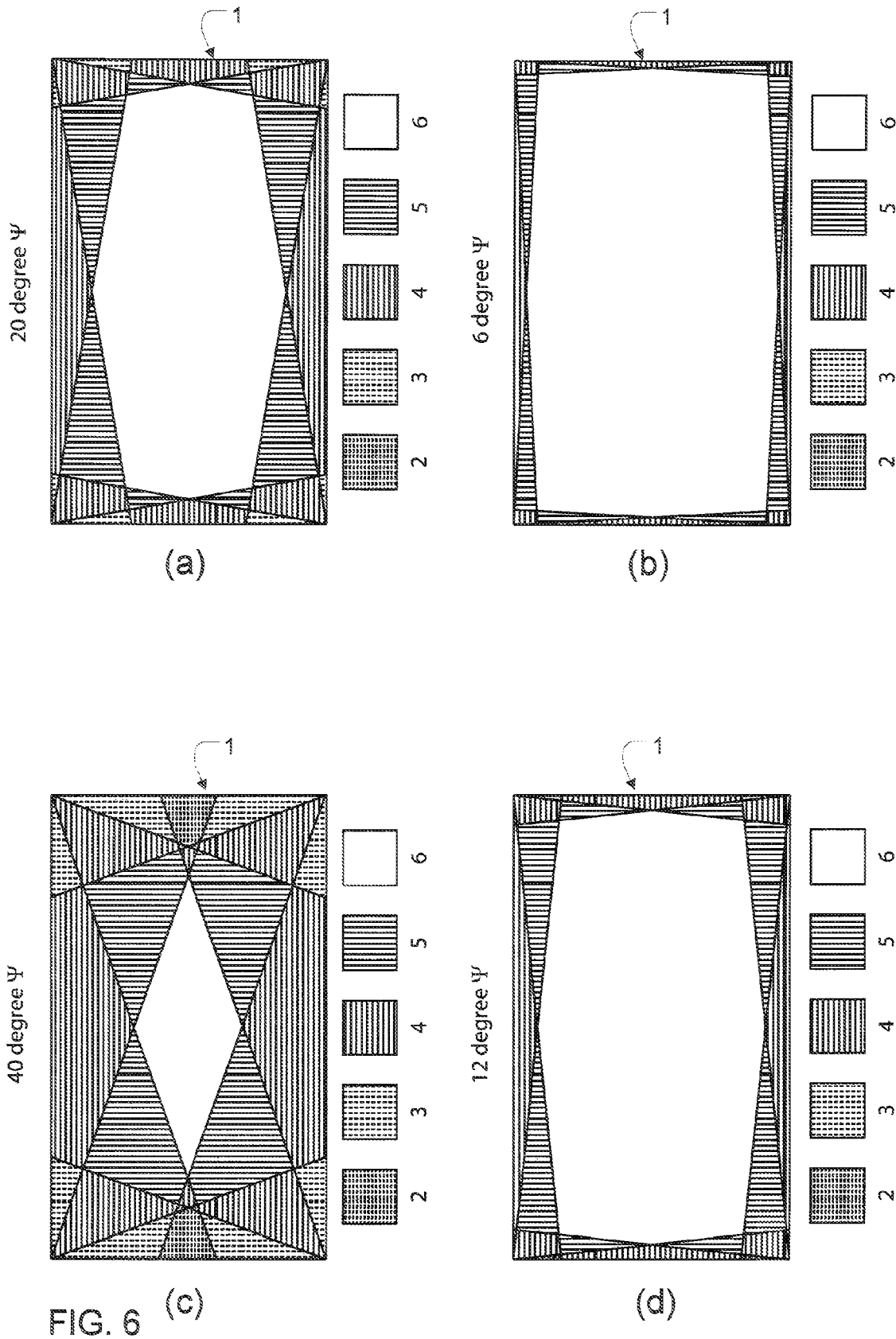
FIGS. 6A-6D illustrates the location of different sensing portions in an embodiment with a dual Ψ-scan beam arrangement for mutual beam angles of 6°, 12°, 20° and 40°.

FIG. 6 illustrates the location of different sub-portions on a rectangular panel swept by six beams in the dual Ψ-scan configuration shown in FIG. 4B. FIG. 6 shows the influence of the maximum mutual angle between the beams in each Ψ-scan (i.e. the acute angle between beams B1 and B2, and between beams B5 and B6, respectively in FIG. 4B). The distribution and size of the sub-portions do not differ between FIG. 6 and FIG. 5. However, with a dual Ψ-scan, each sub-portion is swept by two more beams, which serves to increase the performance of the system. For example, the ability of the system to detect multiple touches is enhanced, and already at a maximum mutual angle of about 12°-15° (cf. FIG. 6(d)), there are essentially no sub-portions that are swept by less than four beams.

Generally, a v/Ψ-scan involves sweeping at least one set of mutually acute beams in a given sweep direction across the panel, wherein the beams included in the set have a maximum mutual acute angle of ≤30°, and preferably ≤20°. In a v-scan, there are two beams in each set, and in a Ψ-scan there are three beams in each set. In a Ψ-scan, the main direction of one of these beams is preferably orthogonal to the sweep direction.

One benefit of having the central beam in a Ψ-scan orthogonal to the sweep direction is that the central beam will be swept over the whole panel, at least if panel is rectangular. Compared to a dual v-scan, the two central beams of a dual Ψ-scan may be swept across the entire panel, and this may result in a significant improvement in performance at the periphery of the panel.

A general advantage of using v- and Ψ-scans is that suitable performance of the touch-sensing system can be attained by sweeping only a few beams across the panel. Furthermore, both v- and Ψ-scans can be realized by space-efficient, simple and robust combinations of components. Detailed examples of such realizations will be described in detail below with reference to FIGS. 21-26.

It has surprisingly been found that an asymmetric beam arrangement may enable determination of a greater number of touch locations for a given number of beams, and/or improve the robustness in determining touch locations. Such an asymmetric beam arrangement may be obtained by arranging at least three beams such that each pair of beams defines a unique mutual acute angle. For example, each pair of beams in a set of beams forming a Ψ-scan may have a unique mutual acute angle. In another variant, an asymmetric beam arrangement is obtained by arranging at least two beams such that they have different angles to a common sweep direction (e.g. $\alpha1 \neq \alpha2$ in FIG. 2C).

FIG. 7 illustrates a dual Ψ-scan arrangement that may be asymmetric by proper choice of mutual acute angles between the beams B1-B6. In the terminology of FIG. 7, the mutual acute angles are given by $\alpha$, $\beta$ and $(\alpha+\beta)$ in one set of beams (B1, B2 and B4), and by $\gamma$, $\delta$ and $(\gamma+\delta)$ in the other set of beams (B3, B5 and B6). Thus, a suitable asymmetric beam arrangement is obtained when $\alpha \neq \beta$ and/or $\gamma \neq \delta$. The asymmetric properties may be improved further by selecting $\alpha \neq \beta \neq \gamma \neq \delta$, and even further by selecting $\alpha \neq \beta \neq \gamma \neq \delta \neq (\alpha+\beta) \neq (\gamma+\delta)$. An even more asymmetric be obtained when $\alpha$, $\beta$, $\gamma$ and $\delta$ are selected such that all mutual acute angles defined between the beams B1-B6 are unique. In one such non-limiting example, $\alpha=6°$, $\beta=8°$, $\gamma=7°$ and $\delta=5°$. If the panel is rectangular, with mutually opposite long sides and short sides, the asymmetric properties may be chosen such that the set of beams (B3, B5 and B6) that is swept orthogonally to the long sides of the panel (i.e. in direction R2) has a smaller maximum acute mutual acute angle than the other set of beams (B1, B2 and B4), i.e. $(\gamma+\delta)<(\alpha+\beta)$. Such a beam arrangement may increase the sensing area of the panel compared to other asymmetric dual Ψ-scan arrangements.

Degeneration of Beam Arrangements

In the following, features of different beam arrangements will be further explained with reference to a number of examples. These examples make use of the following definitions.

$S_i$: A measurement signal for beam i.

$S_{ij}$: A scan line for beam i, where j is an index of the peak in the measurement signal originating from one or more touch points along the scan line. Each scan line has a total transmission $T_{ij}$.

$p_n$: A touch point, where n is an index of the touch point. The touch point is generated by an object touching the panel.

$g_m$: A ghost point, where m is an index of the ghost point. A ghost point is defined as a non-existing touch point, which cannot immediately be discarded as being non-existing based on the measurement signals.

In an FTIR system, each touch point $p_n$ has a transmission $t_n$, which is in the range 0-1, but normally in the range 0.7-

0.99. The total transmission $T_{ij}$ along a scan line $S_{ij}$ may be given by the product of the individual transmissions $t_n$ of the touch points $p_n$ on that scan line: $T_{ij}=\Pi t_n$. For example, two touch points $p_1$ and $p_2$ with transmissions 0.9 and 0.8, respectively, on a scan line $S_{ij}$, may yield a total transmission $T_{ij}=0.72$.

This is further illustrated in FIG. 8A, which shows scan lines and measurement signals resulting from two beam sweeps. It should be understood that the processing of the measurement signals aim at identifying the touch points among a set of candidate touch points given by the measurement signals. In this example, the candidate points consist of three touch points $p_1$-$p_3$, and three ghost points $g_1$-$g_3$. The candidate touch points are defined as positions where all available scan lines come together, i.e. one scan line from each beam intersect at a single position. If the touch point has an extended area, the scan lines gain width and the candidate touch points become the union of intersecting scan lines from each beam. This is illustrated in FIG. 8B, in which the grey areas surrounding the touch points and ghost points indicate the union of intersecting scan lines.

In FIG. 8, a total of five scan lines $S_{11}$, $S_{12}$, $S_{21}$, $S_{22}$, $S_{23}$ can be identified from the measurement signals $S_1$, $S_2$. The scan lines yield the following transmissions: $T_{11}=t_1$, $T_{12}=t_2 \cdot t_3$, $T_{21}=t_1$, $T_{22}=t_2$, and $T_{23}=t_3$.

FIG. 9 shows scan lines and measurement signals resulting from three beam sweeps with a beam arrangement as in FIG. 2. FIG. 9A illustrates a case with three touch points $p_1$-$p_3$, and FIG. 9B illustrates a case with four touch points $p_1$-$p_4$. The measurement signals $S_1$-$S_3$ differ between these cases, since the transmission from $p_4$ is multiplied with the transmissions from the other points along the scan lines, as applicable. This also means that once the transmission $t_n$ for one touch point $p_n$ is determined, this transmission $t_n$ can be eliminated from the total transmission of other scan lines that intersect this touch point $p_n$. In the example, of FIG. 9B, the transmission of touch points $p_1$ and $p_3$ can be determined, since scan line $S_{21}$ hits only touch point $p_1$ and scan line $S_{23}$ hits only touch point $p_3$. By measuring $T_{21}$ and $T_{23}$, the values of $t_1$ and $t_3$ are known: $t_1=T_{21}$ and $t_3=T_{23}$. Then, the transmissions $t_2$ and $t_4$ of the other touch points $p_2$ and $p_4$ can be determined:

$$t_4 = \frac{T_{32}}{t_3}, \text{ and } t_2 = \frac{T_{12}}{t_3}.$$

Since all transmissions $t_1$-$t_4$ have been determined, it can be assessed whether the touch point $p_4$ exists or not.

As indicated above, there are combinations of touch points that cannot be resolved, so-called degenerated cases. Thus, in a degenerated case, it is not possible to distinguish, based on the measurement signals, between two or more sets of touch points on the panel. The geometry of these degenerated cases depends on the number of beams used and the mutual acute angle between the main directions of the beams. The occurrence of degenerated cases will be examined in the following for five different beam arrangements: three equiangular beams (FIGS. 10-11), a combination of a single beam and a 20° v-scan (FIG. 12), an asymmetric beam arrangement (FIGS. 13-14), a dual asymmetric v-scan (FIGS. 15-16), a dual asymmetric Ψ-scan (FIG. 17).

In the Figures, d denotes the diameter of a touch point, L denotes the distance between a touch point and a ghost point along scan lines of one beam, and 1 denotes the distance between a touch point and a ghost point along scan lines of another beam.

FIGS. 10A-10B illustrate a degenerated case when using three equiangular beams. Thus, the set of touch points $p_1$-$p_3$ in FIG. 10A yields the same measurement signals as the set of touch points $p_1$-$p_3$ in FIG. 10B. This also means that it is always possible to distinguish between two touch points placed on any of the seven candidate positions in FIG. 10.

Figure 11A:
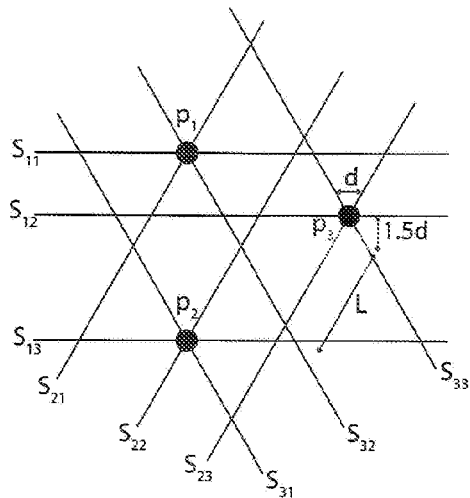
FIGS. 11A-11B illustrates modifications of the touch points in FIG. 10 that eliminate the degeneration.
Figure 11B:
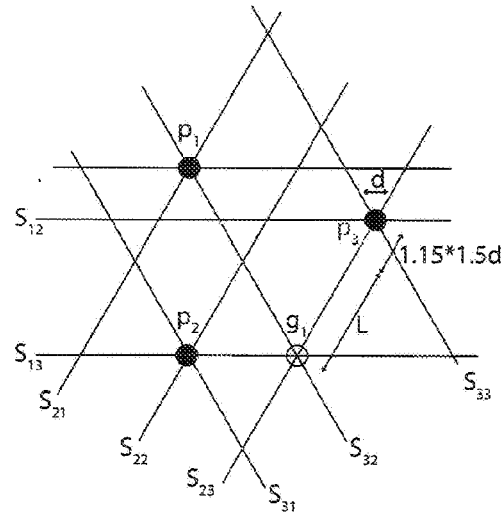

The degenerated case in FIG. 10 can be resolved if, as shown in FIG. 11A, one of the touch points $p_1$-$p_3$ is moved by a distance 1.5 d in a direction that is orthogonal to one of the scan lines, or as shown in FIG. 11B, one of the touch points $p_1$-$p_3$ is moved by a distance $\sqrt{3}$ d, in any direction. Furthermore, the distance between two parallel scan lines needs to be at least 2.5 d. When this movement of a touch point is performed, there is at least one scan line that passes through only one touch point. Thereby, it is possible to determine the transmission of that touch point, whereby the other touch locations can be determined by eliminating the thus-determined transmission.

Figure 12A:
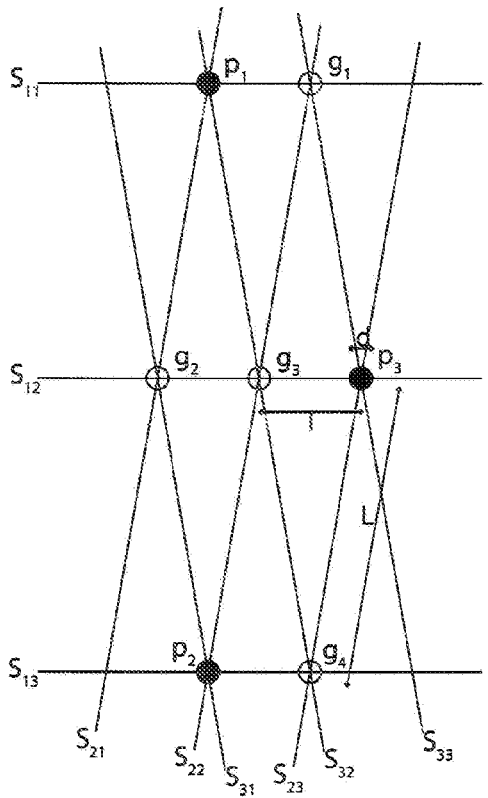
FIG. 12A illustrates a combination of touch points that result in a degeneration of a v-scan 3-beam arrangement.
Figure 12B:
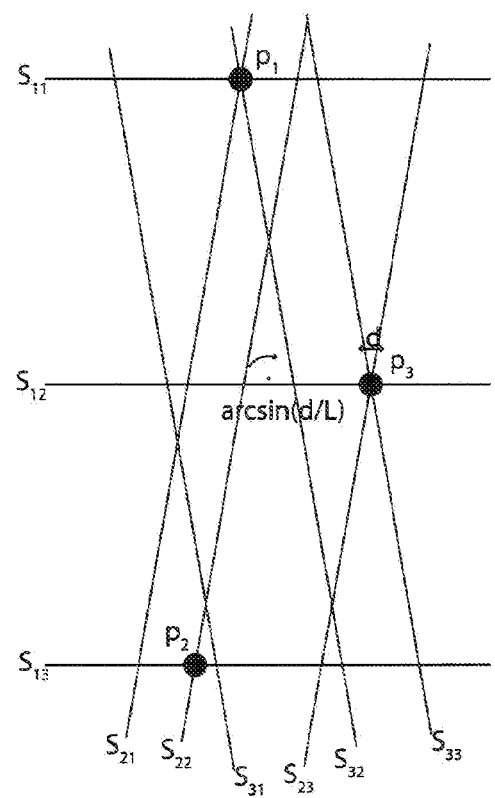
FIG. 12B illustrates a modification of the touch points in FIG. 12A that eliminate the degeneration.

FIG. 12A illustrates a degenerated case when two beams (represented by scan lines $S_{2j}$ and $S_{3j}$, respectively) define a v-scan with a mutual acute angle of 20°, and the main direction of the third beam (represented by scan lines $S_{1j}$) is perpendicular to the normal of the v-scan beams. Compared to FIG. 10, the distances 1 and L become different. As the acute angle between $S_{2j}$ and $S_{3j}$ is reduced, the difference between 1 and L increases. If the distances 1 and L are different, it is possible to resolve the degenerated case, as shown in FIG. 12B, by rotating the set of touch points by an angle of arcsin (d/L), where d is the diameter of the points d and L is the distance between one of the points and its furthest neighbour along the scan lines.

Figure 13A:
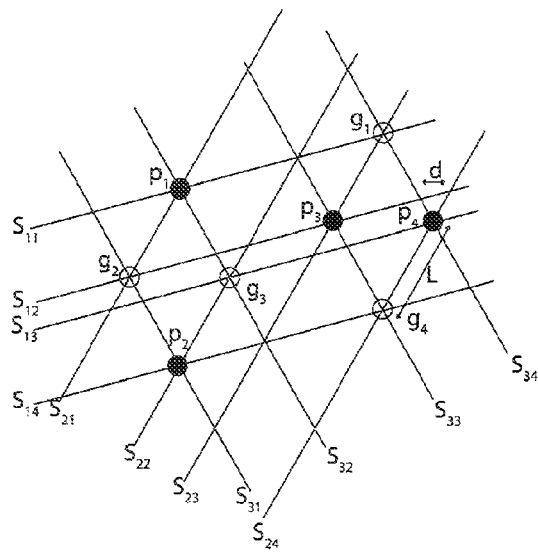
FIG. 13A illustrates a combination of touch points that result in a degeneration of an asymmetric 3-beam arrangement.
Figure 13B:
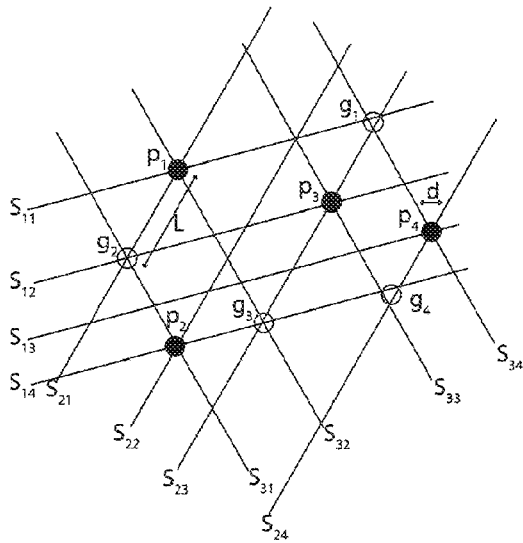
FIG. 13B illustrates a modification of the touch points in FIG. 13A that eliminate the degeneration.

FIGS. 13A-13B illustrate an asymmetric arrangement of three beams, in which the mutual acute angle between the beams is 45° (between $S_{1j}$, and $S_{2j}$), 75° (between $S_{1j}$ and $S_{3j}$) and 60° (between $S_{2j}$ and $S_{3j}$). First, it should be noted that the asymmetric beam arrangement does not result in a degenerated case for any set of three touch points. A degenerated case occurs when a fourth touch point is introduced, e.g. to form the set of touch points $p_1$-$p_4$ shown in FIG. 13A. It can be shown that if one of the touch points $p_1$-$p_4$ is moved a large enough distance, as exemplified in FIG. 13B, the degenerated case resolves. This also means that if any one of the points in FIG. 13A is completely removed, the case resolves.

Figure 14A:
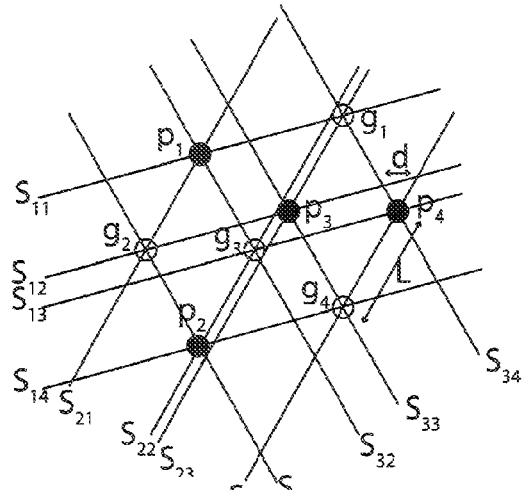
FIGS. 14A-14D illustrates the influence of removal of a touch point on degeneration in an asymmetric 3-beam arrangement.
Figure 14B:
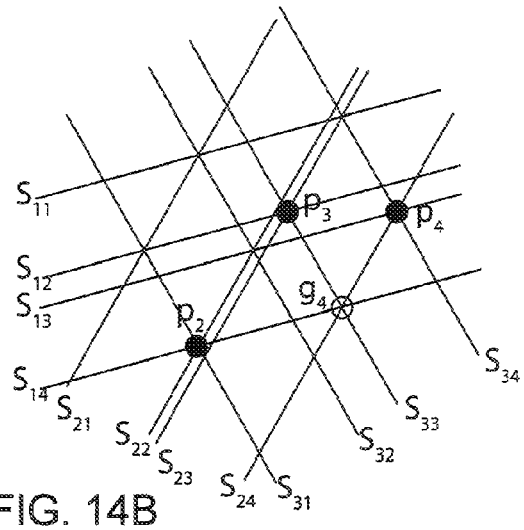
Figure 14C:
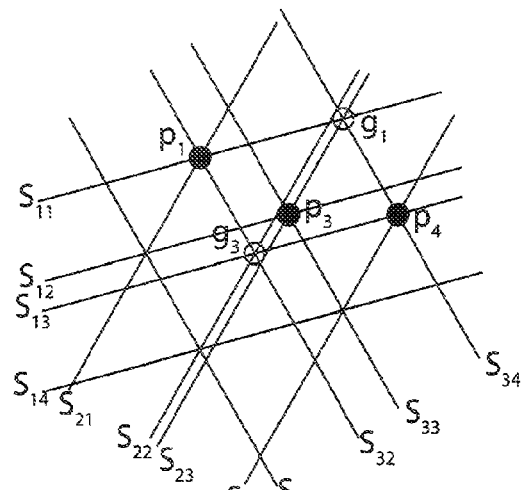
Figure 14D:
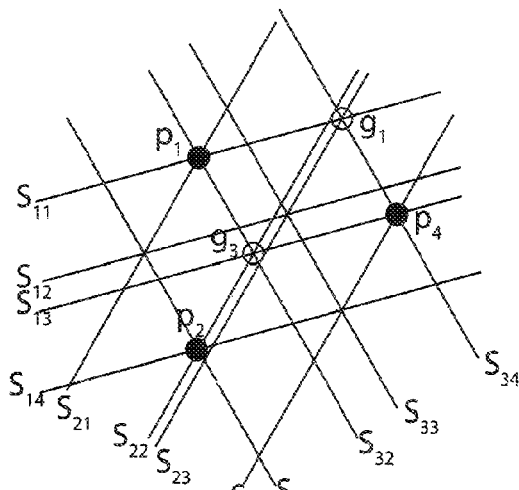

FIGS. 14B-14D further illustrates the result of removing $p_1$, $p_2$ and $p_3$, respectively, from the combination of touch points in FIG. 14A. Specifically, FIG. 14A illustrates a degenerated case for the asymmetric beam arrangement of FIG. 13. As noted above, the touch points $p_n$ and the ghost points $g_m$ form a set of candidate touch points, but it is not possible to identify the touch points $p_n$ from the measurement signals. However, if one touch point is removed from the set of candidate touch points, the rest of the touch points can be determined unambiguously.

If touch point $p_1$ is removed (FIG. 14B), scan lines $S_{11}$ and $S_{21}$ have a transmission equal to one (i.e. there are no touch points along these scan lines), and thus the ghost points $g_1$ and $g_2$ do not exist. Then, since touch points $p_2$ and $p_4$ are the only touch points along the scan lines $S_{31}$ and $S_{34}$, respectively, the corresponding transmissions $t_2$ and $t_4$ can be determined. Thereby, the transmissions of $g_4$ and $p_3$ can be calculated according to the above algorithm.

If touch point $p_2$ is removed (FIG. 14C), scan lines $S_{14}$ and $S_{31}$ have a transmission equal to one, and thus the ghost points $g_2$ and $g_4$ do not exist. It may be noted that scan line $S_{22}$ will not have a transmission equal to one since it partly coincides with scan line $S_{23}$. However, since touch points $p_1$ and $p_4$ are the only points along the scan lines $S_{21}$ and $S_{24}$, respectively, the corresponding transmissions $t_1$ and $t_4$ can be determined. Thereby, the transmissions of $g_1$, $g_3$ and $p_3$ can be calculated according to the above algorithm. If touch point $p_3$ is removed (FIG. 14D), scan lines $S_{12}$ and $S_{33}$ have a transmission equal to one, and thus the ghost points $g_2$ and $g_4$ do not exist. Scan line $S_{23}$ is too close to scan line $S_{22}$ for its transmission to be equal to one. However, since touch points $p_1$, $p_2$ and $p_4$ are the only points along the scan lines $S_{21}$, $S_{14}$ and $S_{24}$, respectively, the corresponding transmissions $t_1$, $t_2$ and $t_4$ can be determined. Thereby, the transmissions of $g_1$ and $g_3$ can be calculated according to the above algorithm.

Figure 15:
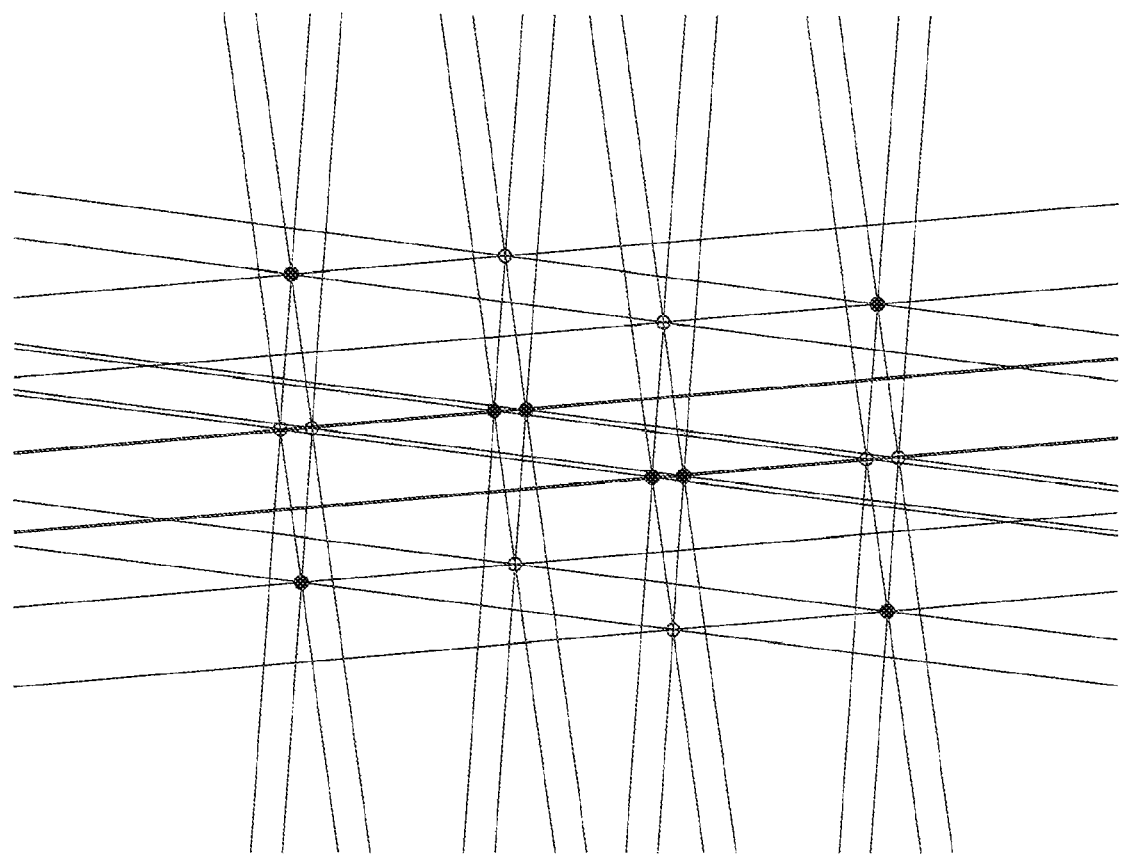
FIG. 15 illustrates a combination of touch points that result in a degeneration of a dual v-scan beam arrangement.

FIG. 15 illustrates scan lines resulting from a set of 8 touch points in touch system operating with an asymmetric dual v-scan arrangement, similar to the one in FIG. 4A. The touch points are marked with black dots and the ghost points are marked with open dots. It is seen that there is at least one touch point and one ghost point on each scan line, and hence the set of touch points represent a degenerated case. Any combination of fewer than 8 touch points can always be resolved, as will be explained with reference to FIGS. 16A-16D.

Figure 16A:
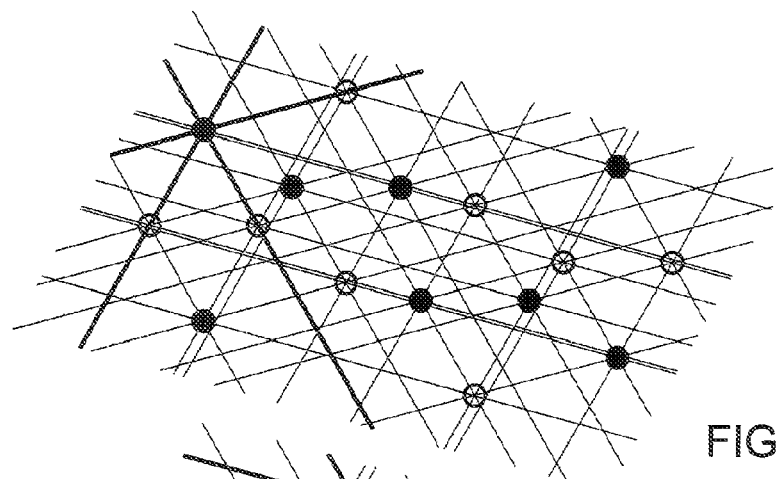
FIGS. 16A-16D illustrates the influence of removal of a touch point on degeneration in a dual v-scan beam arrangement.
Figure 16B:
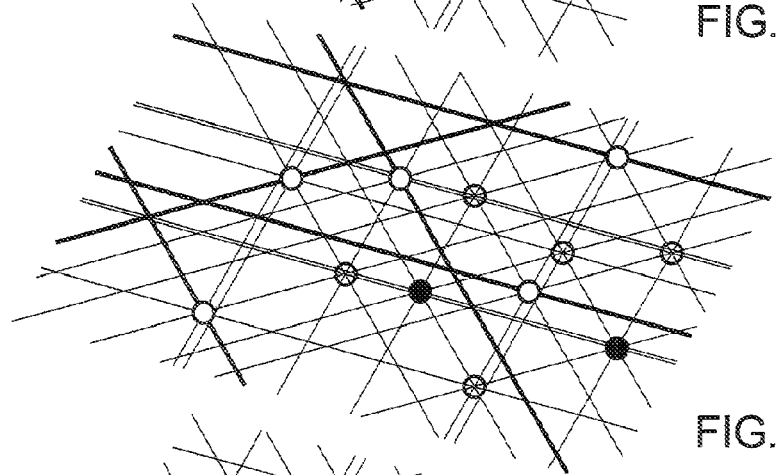
Figure 16C:
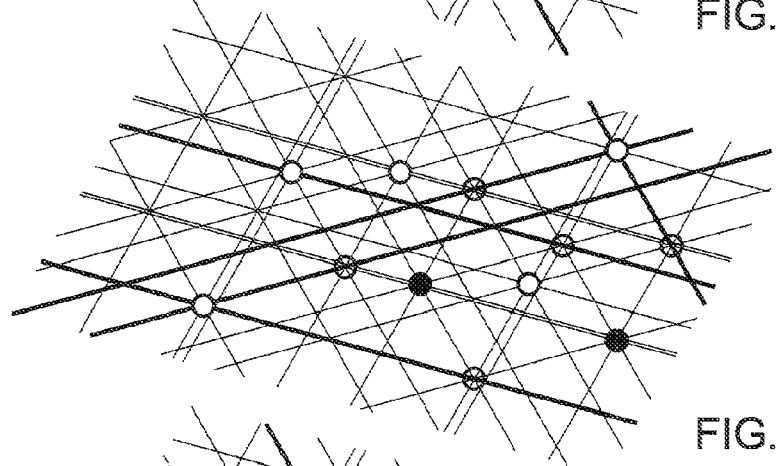
Figure 16D:
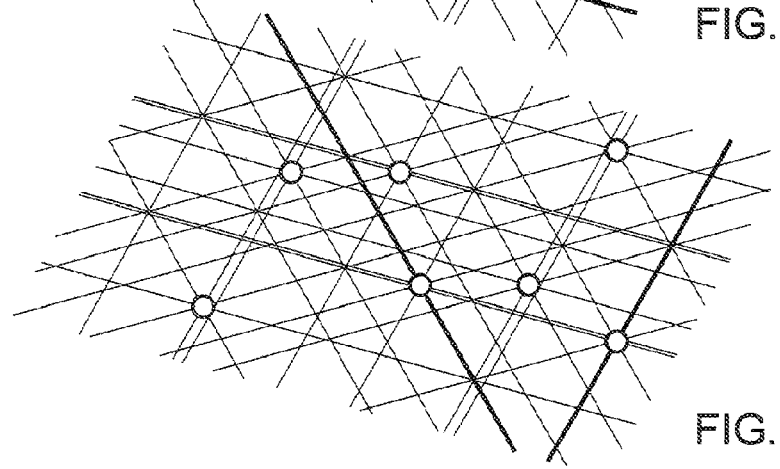

FIG. 16A illustrates scan lines resulting from another combination of 8 touch points in the same touch system as FIG. 15. If the top left touch point is removed, three scan lines (thicker lines in FIG. 16A) will have a transmission equal to 1. Consequently, the three ghost points on these scan lines can be identified as such, making it possible to determine the transmission of five touch points (white dots in FIG. 16B), since these touch points are now the only touch points along a respective scan line (thicker lines in FIG. 16B). After determining and eliminating the transmissions of these touch points, using the above algorithm, another five scan lines (thicker lines in FIG. 16C) will have a total transmission of 1, allowing the remaining five ghost points to be identified as such. FIG. 16D illustrates a final step in which the transmission of the last two touch points is determined using two other scan lines (thicker lines). The above methodology is valid for removal of any touch point from the set of touch points in FIG. 16A.

By sweeping a greater number of beams across the panel, it will be possible to unambiguously identify a greater number of touch locations. For example, a dual $\Psi$-scan will only degenerate for certain combinations of 32 touch points. Thus, in theory, it is always possible to determine the individual transmission of 31 touch points.

Figures 17A, 17B:
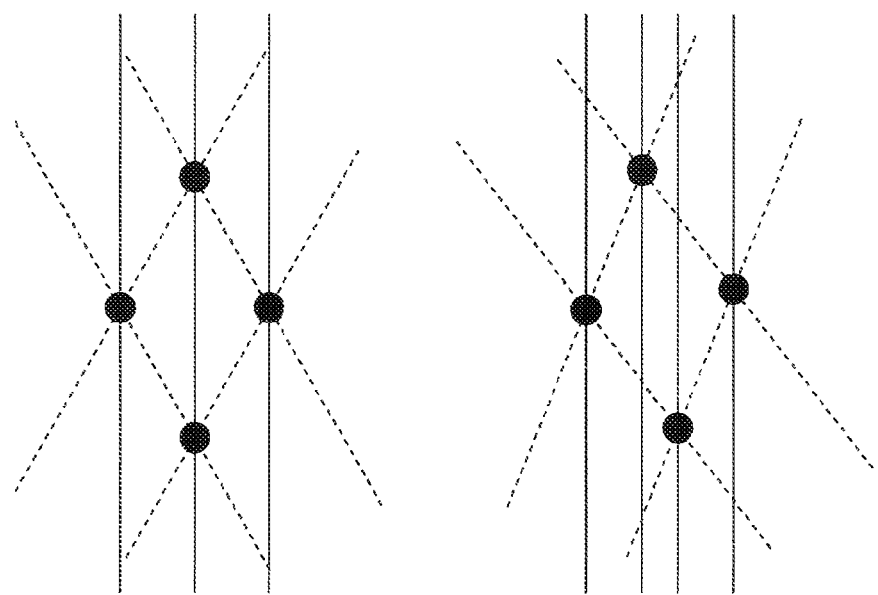
FIGS. 17A-17B illustrates a difference between a symmetric and an asymmetric Ψ-scan beam arrangement in relation to four touch points.

The provision of an asymmetric dual $\Psi$-scan arrangement, as shown in FIG. 7, may give more robust algorithmic steps. FIGS. 17A-17B illustrate four touch points and resulting scan lines for a single set of $\Psi$-scan beams, in a symmetric and an asymmetric arrangement, respectively. In the symmetric beam arrangement of FIG. 17A, the orthogonal scan beam (solid lines) will result in a scan line that hits two touch points. In the asymmetric beam arrangement of FIG. 17B, the corresponding scan lines (solid lines) each hit a single touch point. When the individual transmissions of the touch points are determined, e.g. using the above algorithm, any inaccuracy/noise in the determined transmission of the scan lines will propagate to subsequent steps of the algorithm. It should be realized that such inaccuracy/noise may be reduced by increasing the number of scan lines that hit only one touch point. Thus, an asymmetric beam arrangement may result in a more robust and precise determination of touch locations.

It should be understood that the degenerated cases are worst-case scenarios, which occur only for specific combinations of touch locations. Thus, a touch-sensing system may very well be operable to determine a greater number of simultaneous touch locations than indicated by the degenerated cases. However, the degenerated cases may indicate the average success rate for a certain touch-sensing system.

Although the foregoing examples refer to the use of measurement signals, i.e. signals generated by the detection arrangement, it is to be understood that the actual decoding process for determining the locations of the touching objects may instead operate on transmission signals, which are derived by dividing the measurement signals with a background signal (see below).

Exemplifying System Configurations

The above-described principles and exemplifying beam arrangements for multi-touch detection may be implemented in various types of systems. Three different types of system are described below, for the purpose of illustration only.

Single Pass System

Figure 18A:
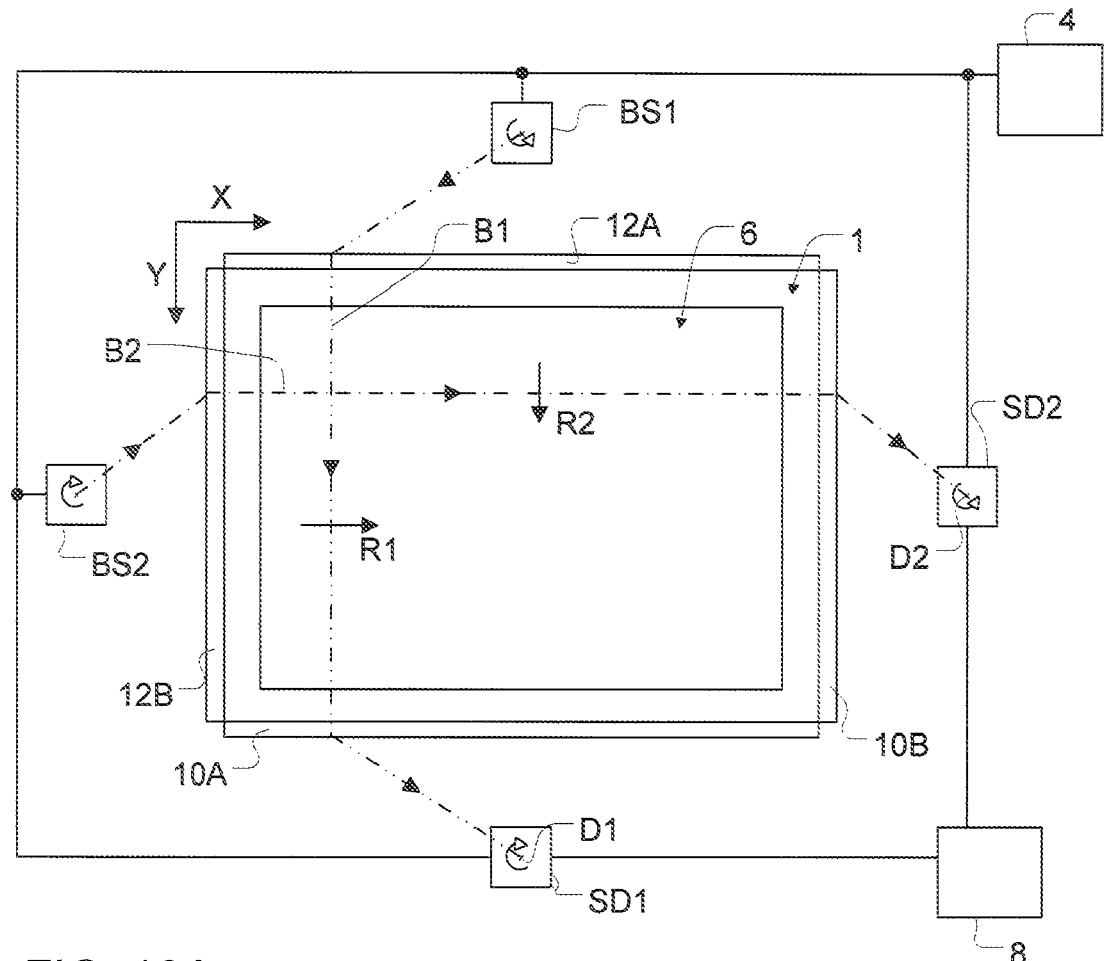
FIG. 18A is a top plan view of a single-pass system capable of implementing an embodiment of the invention.

FIG. 18A illustrates a "single-pass" system, in which beams are injected from one side of the panel and received at the opposite side of the panel. On a general level, the system includes an input scanner arrangement for introducing the beams into the panel and for sweeping the beams across the panel, and an output scanner arrangement which is synchronized with the input scanner arrangement so as to receive the beams from the input scanner arrangement while they are swept across the panel and to direct the beams onto at least one radiation detector. Such a single-pass system is further described in U.S. provisional application No. 61/129,372, filed on Jun. 23, 2008, which is incorporated herein by this reference.

Below, the operating principle of such a single-pass system will be briefly explained in relation to a simplified beam arrangement of two beams B1, B2. It should be understood that the system of FIG. 18A can be extended to any number of beams in any suitable arrangement.

In the example of FIG. 18A, each beam B1, B2 is swept or scanned across the panel by a beam scanner BS1, BS2. After passing the panel, each beam B1, B2 is out-coupled from the panel 1 and received by a scanning detector SD1, SD2, which includes a radiation detector for measuring the beam energy. A control device 4 may be connected to operate each pair of a beam scanner BS1, BS2 and a scanning detector SD1, SD2 in mutual synchronization. Alternatively, the system may include a mechanical arrangement for synchronizing the beam scanners and the scanning detectors.

The scanning detectors SD1, SD2 are connected to a data processor 8, e.g. a computer, which is configured to determine touch locations based on the output signals of the scanning detectors SD1, SD2 for each sensing instance. The output signals represent the energy of each beam as measured by the scanning detectors SD1, SD2 during a sensing instance (cf. signals S1, S2 in FIG. 1A).

In the example of FIG. 18A, the scanning detector SD1, SD2 may include a detector which is controlled to move along the periphery of the panel 1 in a translation movement synchronized with the movement of the beam B1, B2 across the sensing area. However, for reasons of system complexity, size and precision, the detector is preferably not translated. Instead, as indicated in FIG. 18A, a fixed re-directing element 10A, 10B may be arranged to receive and re-direct the transmitted beam B1, B2 onto a common detection point D1, D2 while the beam B1, B2 is swept across the sensing area. To reduce the size of the touch-sensing system, the re-directing element 10A, 10B may be placed near a periphery portion of the panel 1. For reasons of robustness and mounting precision, the re-directing element 10A, 10B may be mounted in contact with such a periphery portion. Non-limiting examples of suitable re-direction elements include diffractive optical elements (DOE), micro-optical elements, mirrors, refractive lenses and any combination thereof.

It may be desirable for the detector to have a small view angle, in order to obtain an adequate precision in determining the touch location(s). This is due to the fact that irregularities in the panel may cause the beam to be scattered while it propagates through the panel, causing the beam to be broadened in the plane of the panel as a function of distance from the injection site. A small view angle of the detector will limit the detection to a confined region around the main direction of the beam B1, B2, thereby increasing the precision in locating the energy decrease caused by a touching object. For example, it may be desirable for the confined region to be about 10 mm, and typically in the approximate range of 1-50 mm, at the outcoupling site on the touch panel (e.g. at the edge of the panel). In order to accommodate for the varying directions of the transmitted beam during the sweep, the scanning detector SD1, SD2 may be configured to scan its field of view in synchronization with the beam sweep. This allows the detector to be configured with a small view angle.

Figure 18B:
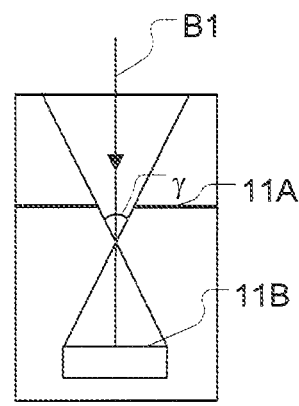
FIG. 18B is a top plan view of a radiation detector that may be included in the system of FIG. 18A.

FIG. 18B illustrates an exemplifying configuration of a radiation detector that may be included in a scanning detector according to any embodiment described herein. The detector may be preconfigured or controllable to provide an adequate view angle γ. The detector includes an aperture stop 11A and radiation-sensing element(s) 11B. The aperture stop 11A is spaced from the radiation-sensing element(s) 11B so as to define the view angle γ. The detector may be adjustable/controllable to change the view angle γ by changing the distance between the aperture stop 11A and the radiation-sensing element(s) 11B, and/or by changing the size of the opening in the aperture stop 11A or the extent of the radiation-sensing element(s) 11B, or both. Further optical elements may be arranged on either side of the aperture stop 11A to improve the detector performance.

The field of view may be scanned mechanically by rotating the radiation detector in FIG. 18B around the common detection point D1, D2. Again, for reasons of complexity, size and precision, it may be undesirable to rotate the entire detector. Instead, a movable deflection element may be arranged at the common detection point D1, D2 to deflect the transmitted beam B1, B2 onto a stationary radiation detector, as will be further exemplified below.

Such a movable deflection element may be any type of element or combination of elements that is/are capable of deflecting a beam of radiation a certain number of degrees. This number of degrees depends on the geometry of the system but generally lie in the range from 1° to 90°. Non-limiting examples of such deflection elements include rotating mirrors, resonant mirrors, galvanometer mirrors, dispersive prisms in combination with tunable light sources, MEMS (Micro-Electro-Mechanical Systems), MOEMS (Micro Opto-Electrical-Mechanical Systems), etc.

According to yet another alternative, the scanning detector SD1, SD2 may be configured to scan its field of view electronically. For example, an array of radiation-sensitive elements (pixels), e.g. in the form of a 1D detector, may be arranged parallel to the panel edge or side that is swept by the beam (e.g. the vertical edge to the right in FIG. 18A). An array of microlenses and pinholes may be arranged in front of the detector so that defined parts (e.g. one or more pixels) of the detector has a confined field of view that covers only a small portion of the panel edge. The array of microlenses and pinholes, or an equivalent element, may replace or supplement the above-mentioned re-directing element (e.g. 10B in FIG. 18A). The detector is synchronized with the beam scanner by the pixels being read out sequentially in coordination with the beam sweep across the panel edge, such that only the detector part that views the instant area illuminated by the beam will give a signal value for that beam position. Thus, the pixels are read out one by one until the beam sweep is completed with the last pixel being read, whereupon the scan may re-start at the first pixel of the detector.

In the system of FIG. 18A, each beam B1, B2 is translated along a respective sweep direction R1, R2 across the panel. In such an arrangement, the spatial resolution is the same across the entire panel, if the same sampling rate is used during the entire sweep. In FIG. 18A, a fixed beam-directing element 12A, 12B is arranged to receive the beam B1, B2 from the beam scanner BS1, BS2 and to cause the beam B1, B2 to be translated with an essentially invariant main direction while it is swept across the panel. Non-limiting examples of suitable beam-directing elements include diffractive optical elements (DOE), micro-optical elements, mirrors, refractive lenses and any combination thereof.

It is to be understood that different combinations of beam scanners BS1, BS2 and scanning detectors SD1, SD2 may be used to sweep the beams B1, B2 across the panel. For example, the system may be configured such that one beam scanner is used to sweep more than one beam, and/or one scanning detector is used to receive more than one of the swept beams.

In another embodiment of a single-pass system, the energy of the transmitted beam is measured by stationary radiation detectors which are arranged at the respective detection point D1, D2. This type of single-pass system is further described in U.S. provisional application No. 61/202,874, filed on Apr. 15, 2009, and U.S. provisional application No. 61/202,875, filed on Apr. 15, 2009, which are incorporated herein by this reference.

Reflector System

Figure 19:
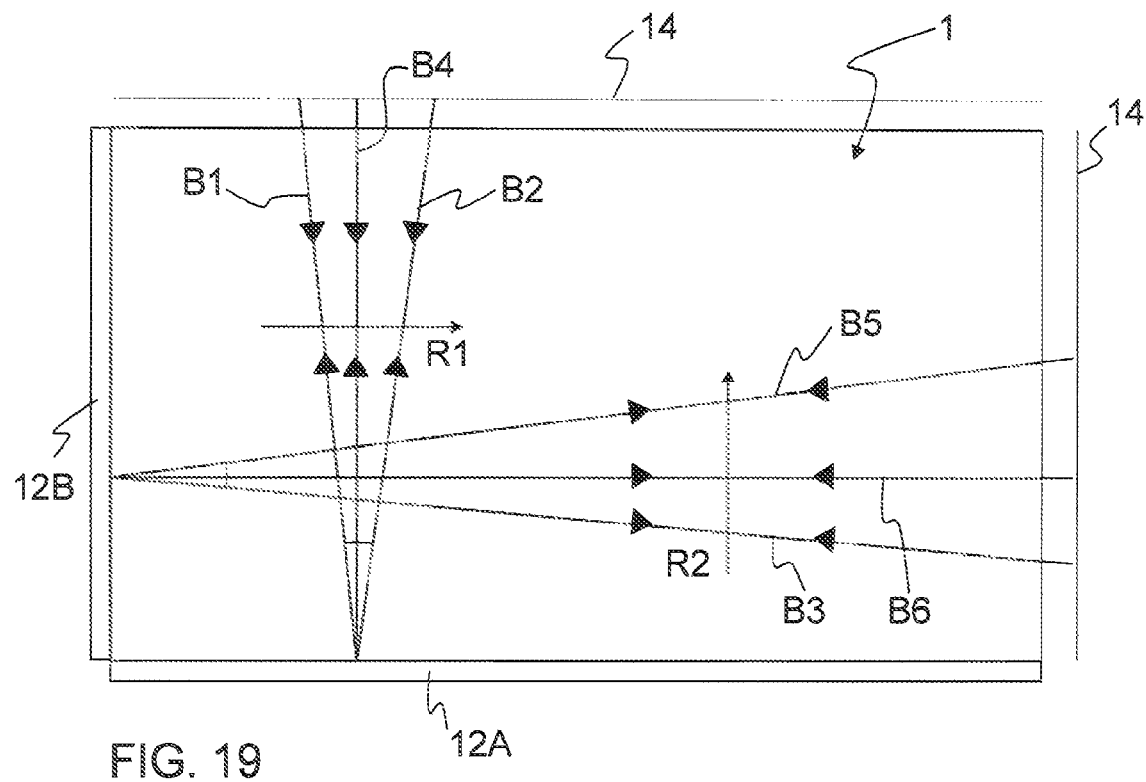
FIG. 19 is a top plan view of a retro-reflecting system with a dual Ψ-scan beam arrangement.

FIG. 19 illustrates an alternative system that has been developed by the present Applicant and proposed WO 2009/048365, which is incorporated herein by reference.

The system of FIG. 19 includes retro-reflectors 14 that are arranged along two non-parallel sides of the panel. A retro-reflector 14 is a component that redirects transmitted radiation back at the source. The retro-reflector may, e.g., be implemented as a set of corner-cube reflectors or a segmented mirror with segments all perpendicular to the source.

In the system of FIG. 19, each beam B1-B6 is introduced and received at the same side of the panel, by an optical transceiver (not shown). The optical transceiver thus implements the functionality of both a beam scanner and a scanning detector. Such an optical transceiver may include a radiation source, a radiation detector, a beam splitter and a movable deflection element similar to the one included in the scanning detector of the single-pass system. A beam of radiation (preferably collimated) is emitted from the radiation source onto the beam splitter, which transmits a portion of the incoming beam onto the deflection element that reflects the beam onto a fixed beam-directing element 12A, 12B at the edge of the panel 1. As the deflection element is moved, typically rotated, the beam will be translated across the panel, as in the single-pass system. When the beam hits the retro-reflector 14, it is reflected back to the beam-directing element 12A, 12B, which directs the beam back to the deflection element. The deflection element reflects the beam onto the beam splitter, which reflects a portion of the beam onto a stationary radiation detector. Thus, as the beam is swept across the panel, the optical transceiver generates a measurement signal that represents the energy of the retro-reflected beam during the sweep.

It is to be understood that each optical transceiver may be configured to sweep more than one beam across the panel.

In a modification of FIG. 19, the retro-reflectors 14 are replaced by reflector components that do not retro-reflect each beam but reflect the beam onto a separate scanning detector. Thus, such a modification may include a combination of beam scanners and scanning detectors similar to the single-pass system, albeit with each beam traversing the panel at least twice before reaching the scanning detector.

In either implementation, the system may comprise a control unit (cf. 4 in FIG. 18A) for synchronizing the optical transceivers or pairs of beam scanners and scanning detectors. Furthermore, the system suitably includes a data processor (cf. 8 in FIG. 18A) for determining touch locations based on measurement signals generated by the radiation detector(s).

Alternative Single Pass Systems

Figure 20:
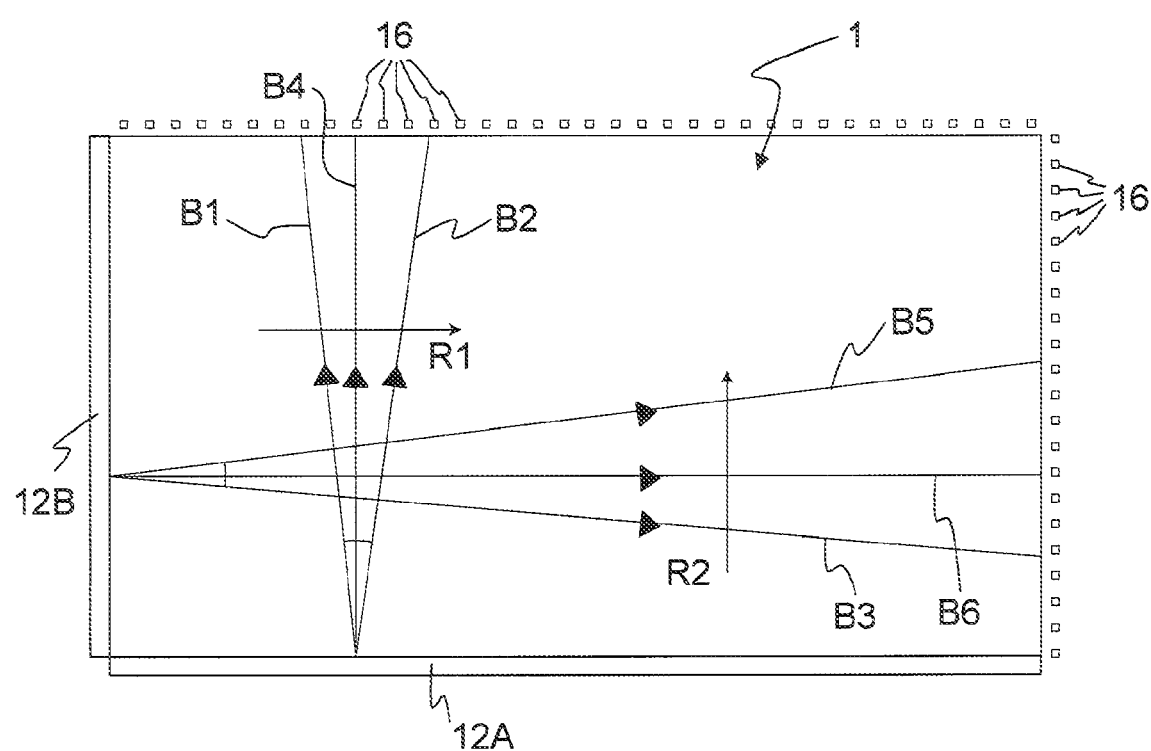
FIG. 20 is a top plan view of a multi-sensor system with a dual Ψ-scan beam arrangement.

FIG. 20 illustrates yet another alternative single-pass system, in which a plurality of radiation-sensitive elements 16 are arranged at two non-parallel sides of the panel to measure the energy of each beam B1-B6 as it is swept across the panel 1. The radiation-sensitive elements 16 may be implemented by two 1-dimensional radiation detectors, and/or by two lines of individual 0-dimensional radiation detectors.

The beams B1-B6 may be swept across the panel 1 using any suitable input scanner arrangement, e.g. the beam scanners and beam-directing elements 12A, 12B of the single-pass system. Although not shown, the system may also comprise a control unit (cf. 4 in FIG. 18A) for synchronizing the beam scanners and the radiation detectors, as well as a data processor (cf. 8 in FIG. 18A) for determining touch locations based on measurement signals generated by the plurality of radiation-sensitive elements 16.

In a non-illustrated variant of FIG. 20, the elements 16 are replaced by two elongate 0-dimensional detectors which are arranged at a respective side of the panel to receive the radiation. Each 0-dimensional detector measures the total received energy as function of time, while the respective beam is swept across the panel.

Implementation Details

Below follows an exemplifying description of specific implementations of single-pass systems, using a v-scan beam arrangement. It is to be understood, though, that similar implementations could be used for providing other beam arrangements, such as the above-mentioned Ψ-scan.

Figure 21:
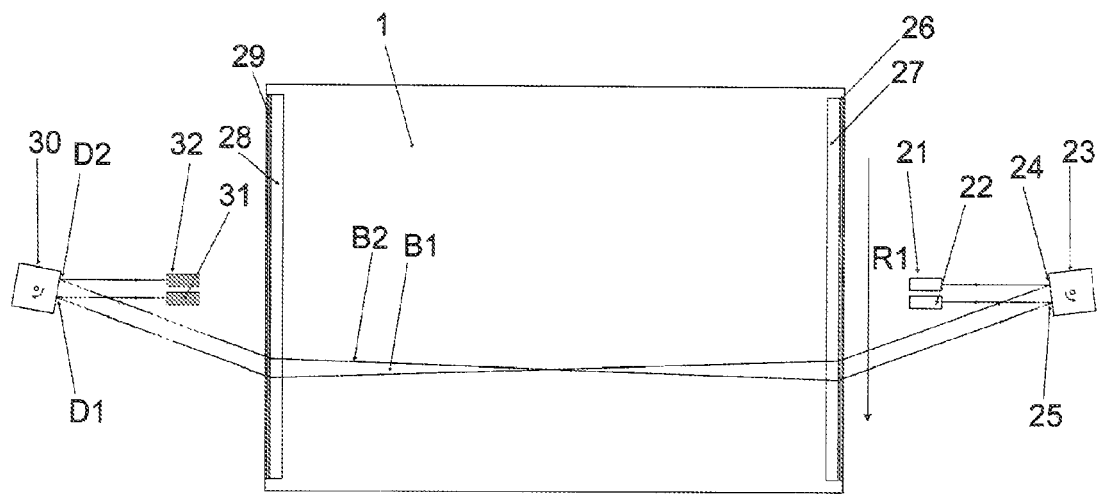
FIG. 21 is a top plan view of an embodiment of a single-pass system.

FIG. 21 shows a touch-sensing system in which beams B1, B2 are emitted by stationary emitters 21, 22 which can be lasers, VCSELs (Vertical-Cavity Surface-Emitting Lasers), LEDs (Light-Emitting Diodes) or any other radiation source, or combination of radiation source and wavelength filter, capable of emitting radiation in a required wavelength band. After being emitted, beams B1, B2 hit a mirror 23 to generate two virtual sources 24, 25. When the mirror 23 turns in the direction of the arrow around its axis of rotation, two scans are generated in the sweep direction R1. The beams B1, B2 travel from the virtual sources 24, 25 through a re-directing lens device 26. The lens device 26 has its focal point between the virtual sources 24, 25, and thus the displacement of the virtual sources 24, 25 creates an angle between the beams B1, B2. The angle between the beams B1, B2 depends on the distance between the virtual sources 24, 25. In one example, the lens device 26 is implemented in the form of one or more Fresnel lenses. The use of Fresnel lenses may be advantageous to reduce the footprint of the system. The lens device 26 is configured such that the main directions of the beams B1, B2 leaving the lens device 26 are unchanged while the beams are swept along the lens device 26 in the sweep direction R1.

After the beams B1, B2 have passed through the lens device 26 they enter a coupling element 27 which guides the beams B1, B2 into the panel 1 in which they propagate by total internal reflection (TIR) until they exit the panel 1 via a coupling element 28 and a beam-directing lens device 29. Typically, the sweep starts at the upper end of the lens device 26 and stops at the lower end of the lens device 29. The lens device 29 may be similar to lens device 26 and configured to direct the beams B1, B2 onto a respective virtual detection point D1, D2 on a mirror 30. The mirror 30 is rotated around its axis of rotation in the direction of the arrow in synchronization with the mirror 23, such that the virtual detection points D1, D2 are fixed in space. The beams B1, B2 are reflected at the virtual detection points D1, D2 and detected by a respective stationary detector 31, 32. Thus, the detectors 31, 32 as well as the emitters 21, 22 are fixed in space, while the beams B1, B2 are swept across the panel 1 in the sweep direction R1. This is achieved by mutually synchronizing the rotating mirrors 23, 30.

In the embodiment of FIG. 21, the mirrors 23, 30 are placed outside the perimeter of the panel 1. This might be undesirable, e.g. if the touch-sensing system is to be integrated with a display device, such as an LCD (Liquid Crystal Display), a plasma display, an OLED (Organic Light-Emitting Diode) display or similar. If components of the touch-sensing system are arranged far from the perimeter of the display, the surface area of the complete system may become undesirably large.

FIG. 22A is an elevated side view of an alternative embodiment in which the beam paths are folded, allowing the mirrors 23, 30 to be placed underneath the panel 1 and the display device 6. The system comprises two folding systems 35, 36 which are arranged on opposite sides of the panel 1. The panel 1 is placed on top of the display device 6, and the coupling elements 27, 28 are attached to the panel 1, e.g. with optically clear glue or any other kind of suitable adhesive. In the system of FIG. 22A, beam B1 is emitted from emitter 21 to hit rotating mirror 23, which reflects beam B1 towards the folding system 35. After entering the folding system 35, beam B1 is first reflected in stationary mirror 37 and thereafter in stationary mirror 38, whereby the beam B1 is folded into the plane of the panel 1. The folded beam B1 then passes through the lens device 26 and enters the panel 1 via the coupling element 27. The beam B1 propagates through the panel 1 by TIR and exits the panel 1 via the coupling element 28. Thereafter, the beam B1 enters the folding system 36 wherein it passes through the lens device 29, is reflected in stationary mirrors 39, 40, whereby the beam B1 is again folded beneath the panel 1. The beam B1 thereafter exits the folding system 36 and is reflected in the rotating mirror 30 which is synchronized with the rotating mirror 23, whereupon the beam B1 is detected by the detector 31.

Figure 22B:
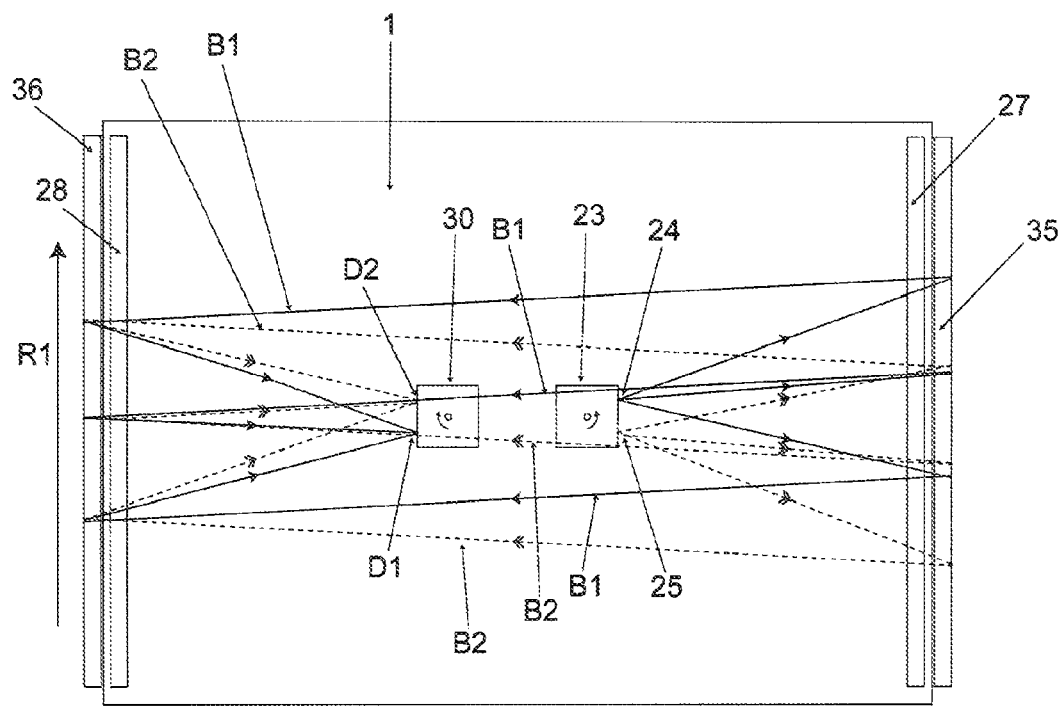

FIG. 22B is a top plan view of the system in FIG. 22A. To simplify the illustration, the emitters 21, 22 and the detectors 31, 32 have been omitted from the figure. FIG. 22B includes three snapshots of the beams B1, B2 as they are swept across the panel 1 in the sweep direction R1.

If desired, the system of FIG. 22 can be extended to a Ψ-scan system by adding a third virtual source in between the two virtual sources 24, 25.

Figure 23:
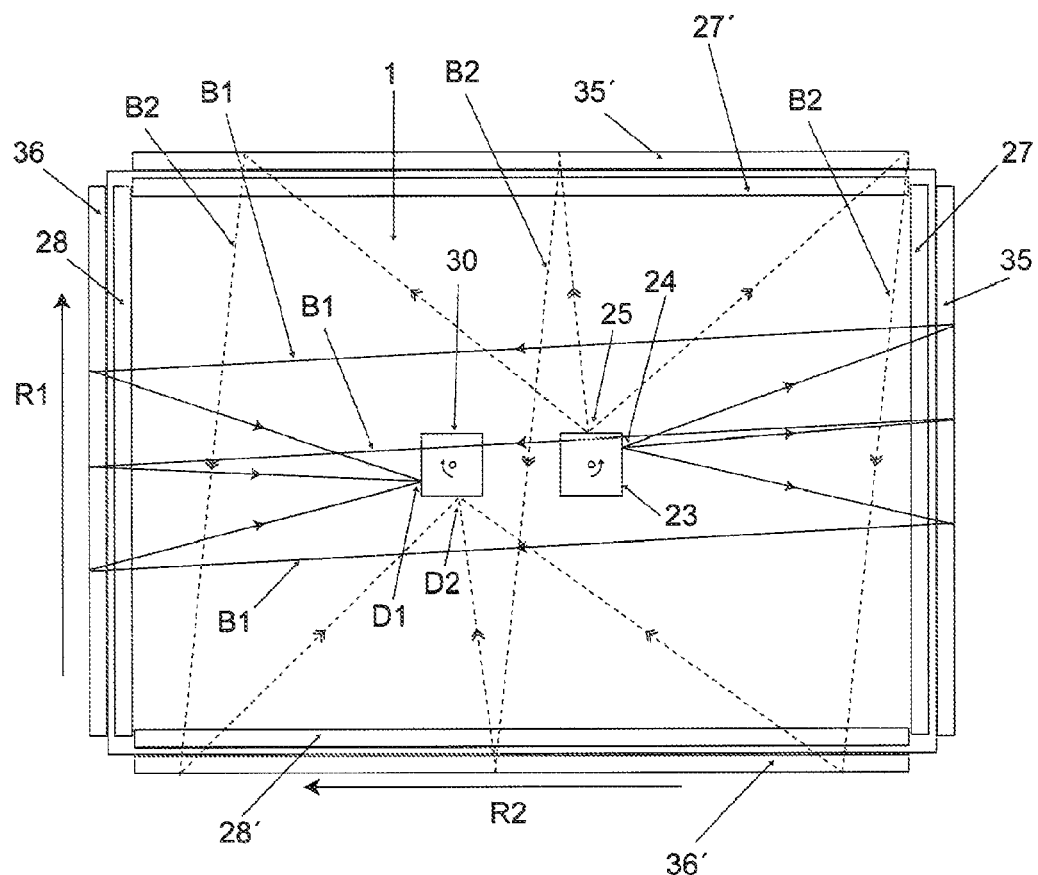
FIG. 23 is a top plan view of another embodiment with folded beam paths.

FIG. 23 is a top plan view of another embodiment of a v-scan configuration with synchronized scanners and folded beams. Like in FIG. 22B, the emitters 21, 22 and the detectors 31, 32 have been omitted for clarity of presentation. This embodiment utilizes the same arrangement of components for guiding and sweeping beam B1 in sweep direction R1 as the embodiment in FIG. 22, and this description therefore will not be repeated. The system in FIG. 23 further comprises an arrangement of components for sweeping the beam B2 in the sweep direction R2. At the virtual source 25 on mirror 23, beam B2 is reflected towards a folding system 35', which may have the same configuration as the folding system 35, which folds the beam B2 into the plane of the panel 1 and directs the beam through a re-directing lens device (not shown) corresponding to the lens device 26. The beam B2 enters the panel 1 via a coupling element 27', propagates through the panel 1 by TIR and exits the panel 1 via a coupling element 28'. Thereafter, the beam B2 enters a folding system 36', which may have the same configuration as the folding system 36, which directs the beam B2 through a beam-directing lens device (not shown) corresponding to the lens device 29 and folds the beam B2 underneath the panel 1. The beam B2 thereafter exits the folding system 36' and impinges on the virtual detection point D2 on mirror 30. Since the rotation of mirror 30 is synchronized with the rotation of mirror 23, beam B2 may be reflected off the mirror 30 onto a stationary detector (cf. detector 32 in FIG. 21).

It should be apparent to the skilled person that the system of FIG. 23 can be extended to generate a v-scan configuration in each of the sweep directions R1, R2, resulting in a beam arrangement of the type disclosed in FIG. 4A. Such extension involves adding a virtual source next to the virtual source 24 in the same way as in FIG. 22B, and adding a virtual source next to the virtual source 25 in a corresponding way. In a variant, such a system is created by using four rotating mirrors, synchronized in pairs, as is readily realized by the skilled person.

Figure 24A:
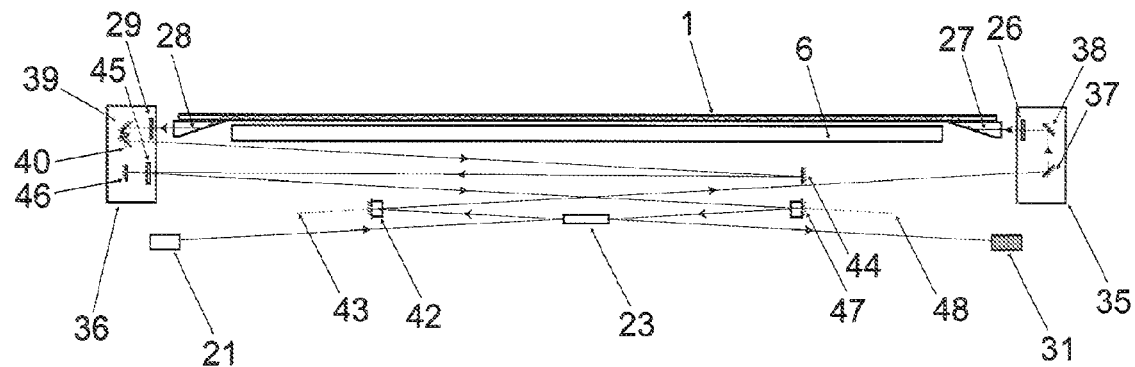
FIGS. 24A-24B are elevated side and top plan views, respectively, of yet another embodiment with folded beam paths.
Figure 24B:
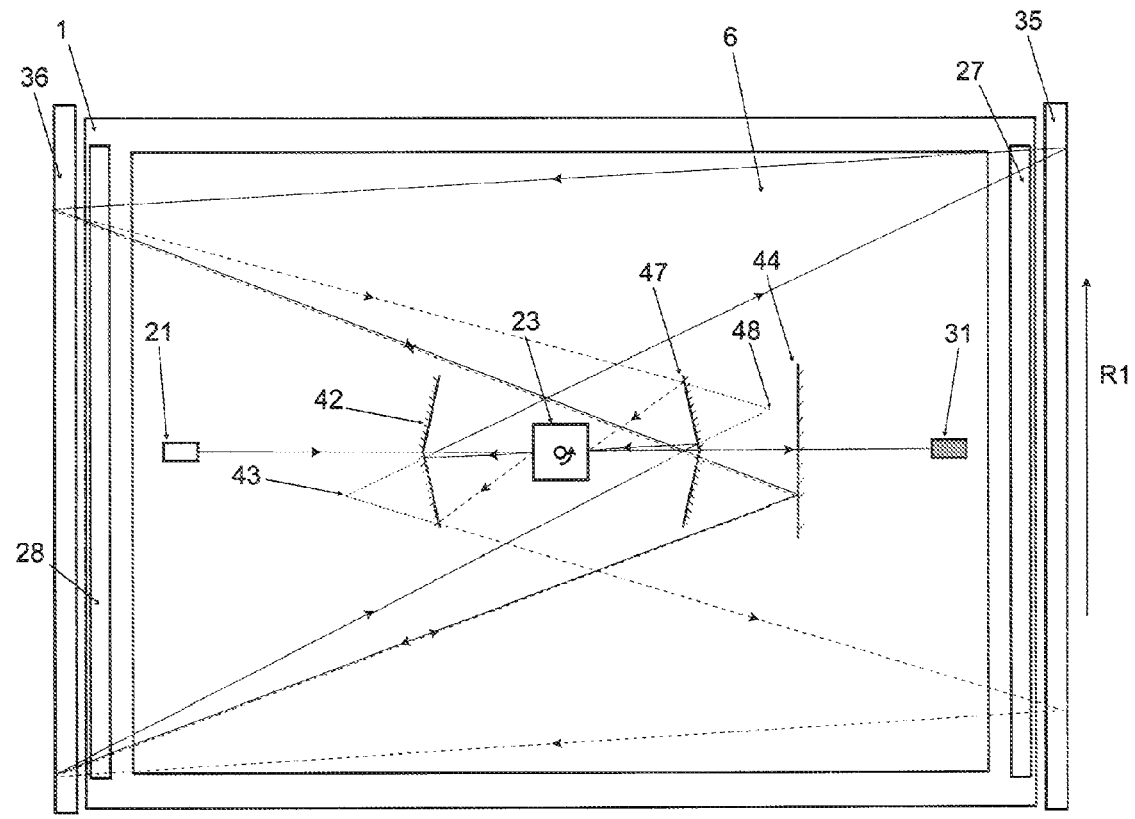

In order to optimize the cost of the touch-sensing system, it may be desirable to reduce the number of components in the system. FIGS. 24A-24B illustrate an embodiment in which the numbers of emitters, detectors and rotating mirrors have been reduced by 50%. As will be further described in the following, this reduction has been accomplished at the cost of four additional stationary mirrors and one additional lens device for each v-scan. However, the added components may be cheaper and less prone to errors than the emitters, detectors and rotating mirrors. To be specific, the most vulnerable component in the system is the rotating mirror; eliminating any number of rotating mirrors greatly reduces the risk of system failure. Furthermore, in the systems disclosed in FIGS. 21-23, the rotating mirrors 23, 30 need to be synchronized with a synchronizing system. In the system in FIGS. 24A-24B, one and the same rotating mirror is used both for sweeping the beams and for collecting the beams onto the detectors.

Looking at the beam path indicated by a solid line in the elevated side view of FIG. 24A and the top plan view of FIG. 24B, a beam is emitted from emitter 21 and is thereafter reflected in the rotating mirror 23, causing the beam to be swept over a first roof top mirror 42 creating two virtual sources, one for each part of the roof top mirror 42. For reasons of clarity only one virtual source 43 is shown. These virtual sources operate in the same way as the virtual sources 24, 25 in FIG. 22B, except that they are both created using only one emitter 21 and the roof top mirror 42. The beam continues towards and into folding system 35, is reflected in stationary mirrors 37, 38 and passes through lens device 26 before entering panel 1 via coupling element 27. The beam propagates through the panel 1 by TIR and exits the panel 1 via coupling element 28. Then, the beam enters folding system 36 where it passes through lens device 29 before being reflected in mirrors 39, 40. Thereafter, the beam is reflected in an inverting mirror 44 towards a lens device 45 and a mirror 46, which may or may not be arranged as part of the folding system 29. The beam passes lens device 45, is reflected in mirror 46, and once again passes through lens device 45. The beam is then reflected in a second roof top mirror 47. As the beam is swept over the roof top mirror 47, two virtual detection points are created. Again, to preserve clarity, only one virtual detection point 48 is shown. These virtual detection points operate in the same way as the virtual detection points D1, D2 in FIG. 22B. The beam then continues towards and is reflected in rotating mirror 23 and due to the effects of inverting mirror 44, lens device 45 and mirror 46, the sweep has now been inverted and the rotating mirror 23 is auto-synchronized with itself, whereby the beam is always hitting detector 31 which is fixed in space. Another beam path is shown by a dashed line in FIG. 24B, illustrating that the beam is translated across the panel 1 with an invariant main direction as the beam is swept across one part of the roof top mirror 42. The skilled person realizes that a full sweep across the roof top mirror 42, results in one beam being swept twice across the panel 1 in direction R1, forming a v-scan configuration.

If desired, the system of FIG. 24 can be extended to a Ψ-scan system by adding a third virtual source. For example, a Ψ-scan may be created by adding another facet to the roof top mirror 42. Thus, such a Ψ-scan system would have a mirror 42 with three facets.

Figure 25:
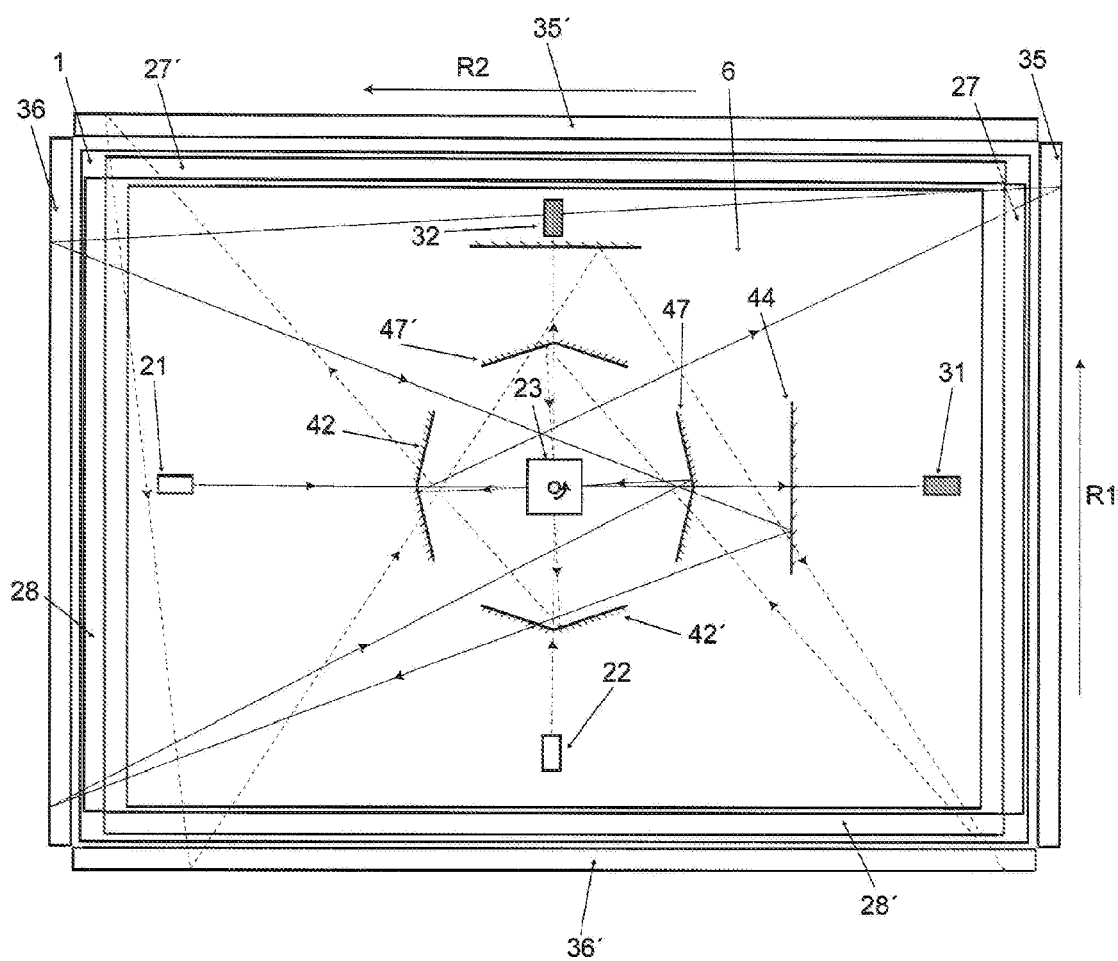
FIG. 25 is a top plan view of yet another embodiment with folded beam paths.

FIG. 25 is a plan view of a variant of the system in FIG. 24. Here, the system is configured to generate a v-scan in two sweep directions R1, R2. The virtual sources (not shown for clarity) are being created by roof top mirror 42 for sweep direction R1 and by roof top mirror 42' for sweep direction R2 Likewise the virtual detection points (not shown for clarity) are created by roof top mirror 47 for sweep direction R1 and by roof top mirror 47' for sweep direction R2. It should be noted that FIG. 25 only shows a snapshot of the beam path. As the beams from emitters 21, 22 are swept over the whole of roof top mirrors 42, 42', a full v-scan will be performed inside plate 10 in both directions R1, R2. Folding systems 35, 35' may be identical except for their length; likewise folding systems 36, 36' may be identical except for their length.

In certain applications, it may be desirable to reduce the thickness of the touch-sensing system. This is the case, e.g., if the touch-sensing system is to be incorporated in laptop computers, tablet computers, mobile terminals, PDAs and similar products. FIG. 26 illustrates an embodiment configured to allow for a reduced thickness. Specifically, the thickness of the system in this embodiment is determined by its thickest component, i.e. no components need to be stacked onto each other. Depending on the choice of components, the thickness of the system can range from a few tenths of a millimeter up to several centimeters.

Figure 26A:
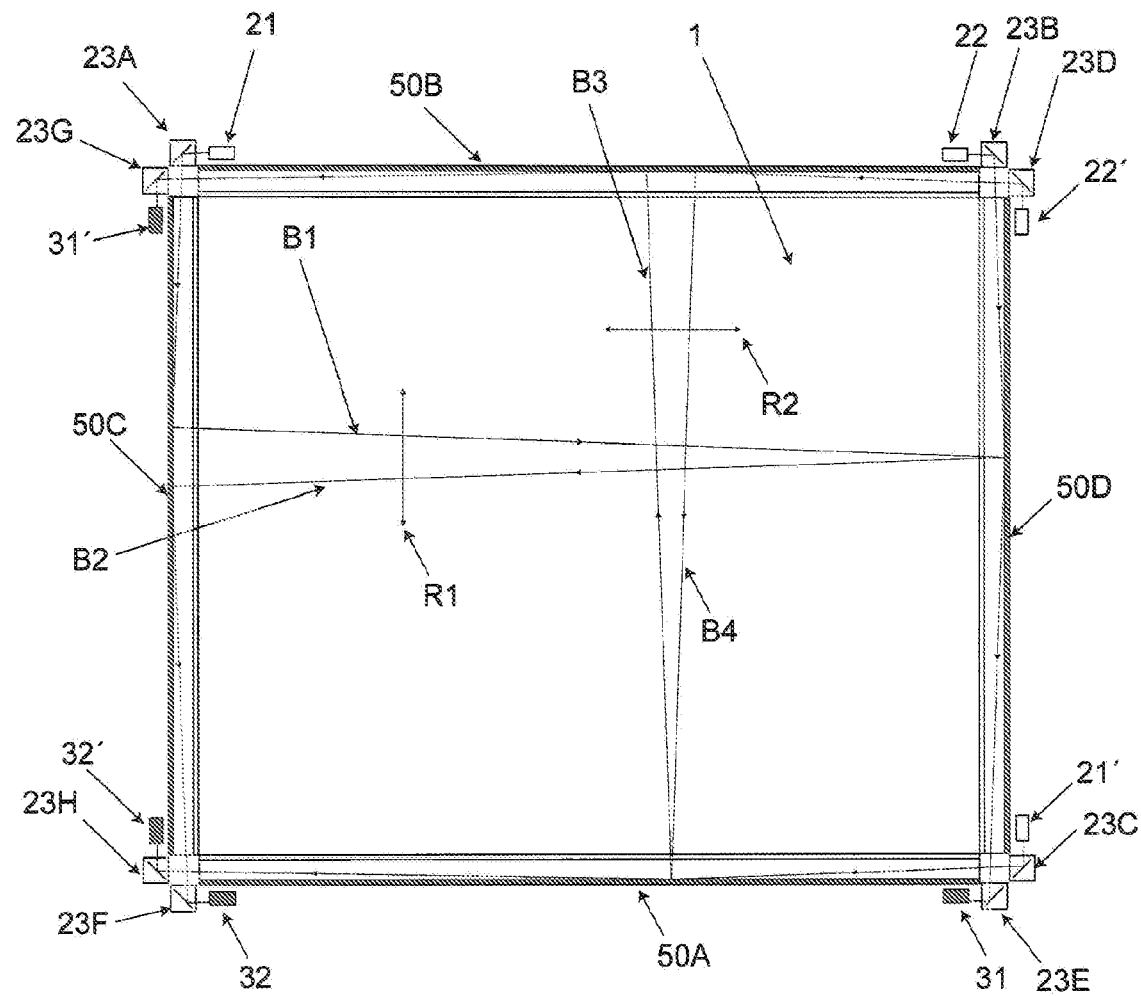
FIG. 26A is a top plan view of an embodiment with corner-located beam scanner and scanning detectors.
Figure 26B:
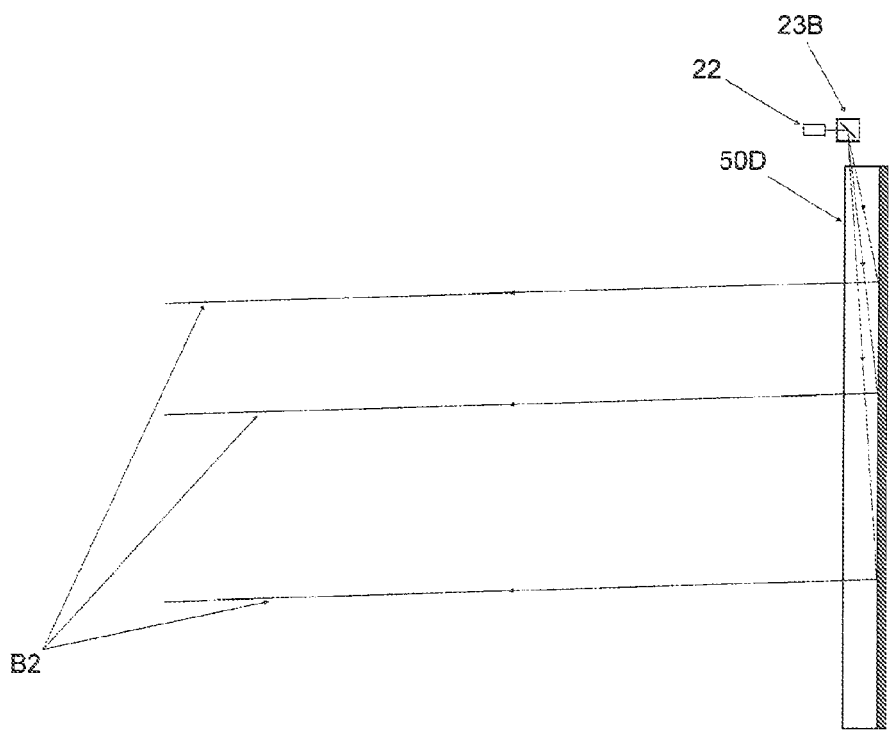
FIG. 26B shows a detail of the embodiment in FIG. 26A.
Figure 26C:
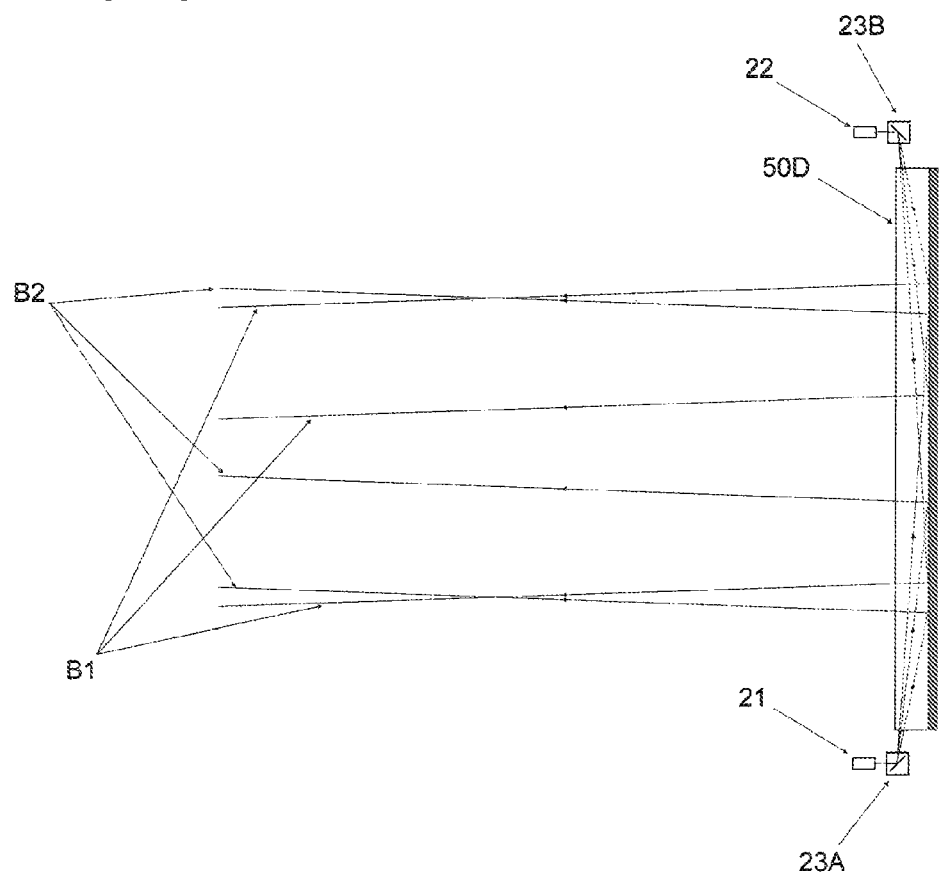
FIG. 26C shows a detail of an alternative embodiment.

The system of FIG. 26 has been designed to achieve a v-scan in two orthogonal directions R1, R2 across the panel 1. As shown in the plan view of FIG. 26A, the system thus comprises four emitters 21, 21', 22, 22' arranged to emit a respective beam of radiation, four detectors 31, 31', 32, 32' arranged to measure the energy of a respective beam, and eight movable deflection elements 23A-23H which are controllable to form synchronized pairs of beam scanners and scanning detectors in the system. Furthermore, four optical re-direction devices 50A-50D are fixedly arranged to extend along a respective periphery portion of the panel 1. Each optical redirection device 50A-50D may comprise a sequence of elements, wherein each element is designed to re-direct an incident beam from a given direction into a given outbound direction. In the illustrated example, each optical re-direction device 50A-50D is configured to re-direct the respective beam B1-B4 in one and the same direction, thereby causing each beam B1-B4 to be swept across the panel 1 with an invariant main direction. Non-limiting examples of optical re-direction devices include diffractive optical elements (DOE), micro-optical elements, mirrors, refractive lenses and any combination thereof. The re-direction devices 50A-50D will be described in more detail with reference to FIGS. 26B-26C.

The touch-sensing system in FIG. 26A, operates by emitting a beam B1 from emitter 21 onto deflection element 23A which is operated to sweep the beam B1 from top to bottom of the optical redirection device 50C. The optical redirection device 50C is configured to redirect the beam B1 so that the beam B1 always has the same direction independently of where on the optical redirection device 50C the beam B1 hits. The beam B1 enters the panel 1 and propagates through panel 1 via TIR. The beam B1 exits the panel 1 and enters into the optical redirection device 50D which is configured to, irrespective of where on the optical redirection device 50D the beam B1 hits, always redirect the beam B1 towards the deflection element 23E. The movement of the deflection element 23E is synchronized (mechanically or electronically) with the deflection element 23A, causing the beam B1 to be deflected towards the radiation detector 31 during the entire beam sweep.

Similarly, beam B2 is generated by emitter 22 and guided by deflection element 23B, optical redirection device 50D, optical redirection device 50C, deflection element 23F onto radiation detector 32.

Similarly, beam B3 is generated by emitter 21' and guided by deflection element 23C, optical redirection device 50A, optical redirection device 50B, deflection element 23G onto radiation detector 31'.

Similarly, beam B4 is generated by emitter 22', and guided by deflection element 23D, optical redirection device 50B, optical redirection device 50A, deflection element 23H onto the radiation detector 32'.

Thereby, two v-scans are generated along the sweep directions R1, R2 in the panel.

The optical redirection device 50A-50D is further illustrated in FIG. 26B, which illustrates three snapshots/instances of beam B2, as emitted by emitter 22, while it is being swept by deflection element 23B across the optical redirection device 50D. The task of the optical redirection device 50D is to receive all instances of beam B2 that originate from the deflection element 23B and redirect them so that they become mutually parallel, as shown in FIG. 26B. Since ray paths are always reversible, it is clear that if the illustrated beam paths were to be reversed, they would all converge towards the deflection element 23B. After traversing the panel 1, the mutually parallel instances of beam B2 hit the optical redirection device 50C (FIG. 26A) which can be designed, similarly to the optical redirection device 50D, to cause all instances of beam B2 to converge onto the deflection element 23F. Based on knowledge of where on the optical redirection device 50C the instances are going to hit, deflection element 23F can be controlled to deflect all instances of beam B2 onto detector 32. For example, deflection element 23F may be synchronized with deflection element 23B which sweeps beam B2 along the optical redirection device 50D and thereby also sweeps beam B2 along optical redirection device 50C after it has passed through the plate 1. The optical redirection device 50A-50D can for example be a diffractive optical element (DOE).

In an alternative configuration of the embodiment in FIG. 26A, two of the optical redirection devices 50A-50D may be arranged and configured to operate on beams received from deflection elements at both ends of the optical redirection device, and two of the optical redirection devices 50A-50D may be arranged and configured to direct the transmitted beams onto deflection elements at both ends of the optical redirection device. Part of such a configuration is shown in FIG. 26C, in which the paths of beam B1 are mutually parallel, the paths of beam B2 are mutually parallel, and both beams B1, B2 are redirected by optical redirection device 50D. In FIG. 26C, beams B1, B2 originate from emitters 22, 23, respectively, but due to the above-mentioned reversibility of the ray paths, either of the emitters 22, 23 can be replaced by detectors. Thus, this design principle results in the desired redirecting function of the optical redirection devices 50A-50D.

In either configuration, the optical redirection devices 50A-50D may be attached to the edges of panel 1 with an adhesive, which is optically clear (in the wavelength range used) so as to minimize any radiation loss in the interfaces between the panel 1 and the optical redirection devices 50A-50D. Alternatively, other mechanical solutions are readily available to the skilled person for attaching the optical redirection devices 50A-50D to the panel 1.

It is to be understood that features of the systems disclosed in FIGS. 21-26 and discussed above may also be applicable to systems with stationary detectors in the detection points, as well as reflector systems (e.g. as shown in FIG. 19) and alternative single-pass systems (e.g. as shown FIG. 20), in particular features relating to the input scanner arrangement, including, e.g. generation, injection and sweeping of beams.

Determination of Touch Locations

Figure 27:
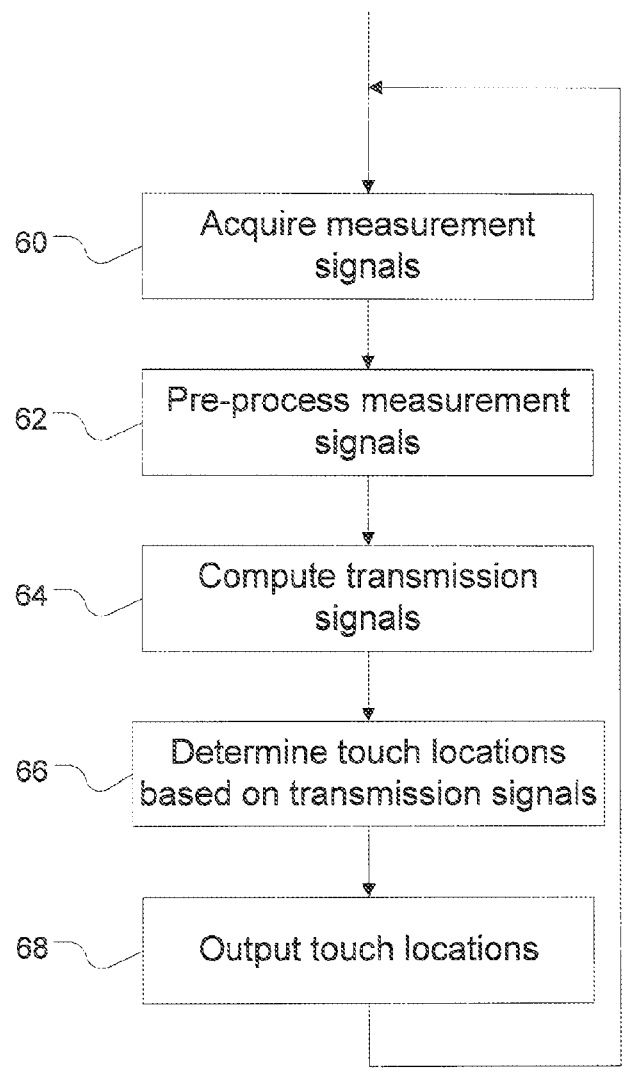
FIG. 27 is a flow chart of an exemplifying method for determining touch locations in a touch-sensing system.

In all of the above-described embodiments, configurations, arrangements, alternatives and variants, a data processor (cf. 8 in FIG. 18A) may be configured to calculate the touch locations based on measurement signals derived from one or more radiation detectors. The skilled person will readily realize that there are numerous methods for determining the touch locations. FIG. 27 is a flow chart of one such exemplifying method.

In step 60, measurement signals are acquired from the radiation detector(s) in the system. Each measurement signal represents the transmitted energy of a single beam and contains data values sampled at N time intervals during a sensing instance. These time intervals correspond to different spatial positions at the outcoupling site(s) on the panel. Thus, step 60 may involve mapping the measurement signals to spatial positions, so as to convert the time-dependent measurement signals into the panel coordinate system, whereby each of the N data values is associated with a scan line (radiation path) across the sensing area. Different embodiments for such mapping are described in aforesaid U.S. provisional application No. 61/202,874, which is incorporated herein by reference.

In step 62, the measurement signals are pre-processed. For example, the measurement signals may be processed for noise reduction using standard filtering techniques, e.g. low-pass filtering, median filters, Fourier-plane filters, etc. Furthermore, if the energy of the emitted beams is measured in the system, the measurement signals may be compensated for temporal energy fluctuations in the input scanner arrangement. Furthermore, the measurement signals may contain sensor readings from outside the region of interest, e.g. outside the sensing area of the panel. Thus, the measurement signals may be pre-processed by extracting relevant parts thereof. It may be desired to add one or more trigger points in the measurement signal to improve/facilitate the extraction of relevant data. Such a trigger point may indicate the start or stop of a beam sweep. Furthermore, the measurement signals may be rectified, i.e. converted to have equidistant sampling distance in the panel coordinate system. Such a rectification may include interpolating each measurement signal with a non-linear angle variable, resulting in a data set with samples that are evenly distributed over the panel. Rectification is optional, but may simplify the subsequent computation of touch locations.

In step 64, a transmission signal is calculated for each pre-processed measurement signal, by dividing the measurement signal with a background signal. The background signal represents the transmitted energy with no objects touching the panel, and thus indicates the spatial distribution of radiation within the outcoupling site. The background signal may or may not be unique to each detector/outcoupling site or each measurement signal. The background signal may be pre-set, derived during a separate calibration step, or derived from measurement signals (without any objects touching the panel) acquired during one or more preceding iterations, possibly by averaging a set of such measurement signals.

Figure 28A:
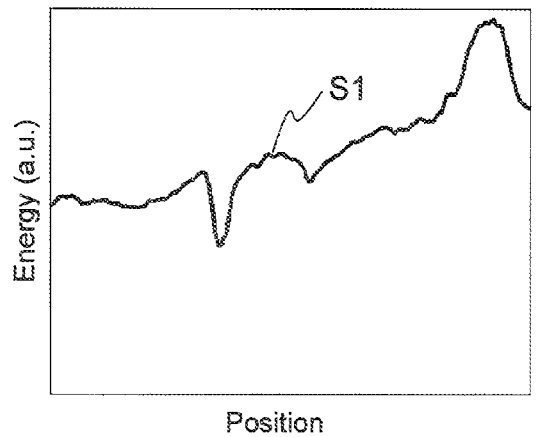
FIGS. 28A-28C are plots of a measurement signal, a background signal and a transmission signal, respectively, as a function of position within an outcoupling site, for a situation with one touching object.
Figure 28B:
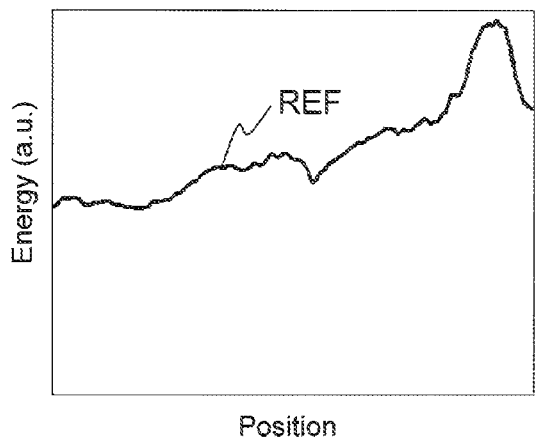
Figure 28C:
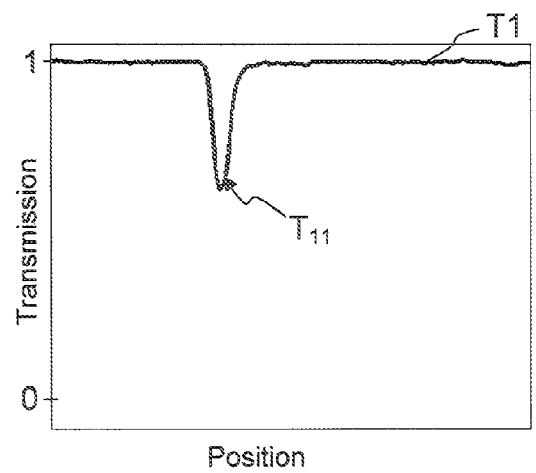

To further illustrate the calculation of a transmission signal, FIG. 28A shows a measurement signal S1 obtained with a single object touching the panel, given as a plot of energy as a function of position within the outcoupling site. FIG. 28B shows a corresponding background signal REF, also given as a plot of transmitted energy as a function of position within the outcoupling site. In this example, the distribution of radiation is highly non-uniform within the outcoupling site. FIG. 28C shows the resulting transmission signal T1=S/REF, which results in a essentially uniform signal level at a (relative) transmission of about 1 with a peak $T_{11}$ caused by the touching object. It is to be understood that the conversion of measurement signals into transmission signals greatly facilitates the identification of relevant peaks. It also makes it possible to compare peaks in measurement signals obtained at different outcoupling sites and/or for different beams.

Figure 29A:
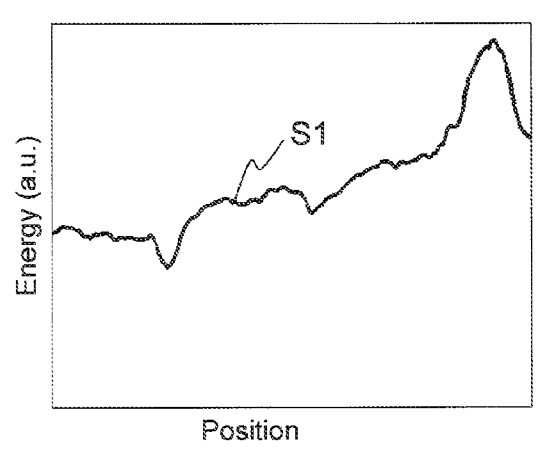
FIGS. 29A-29B are plots of a measurement signal and a transmission signal, respectively, as a function of position within an outcoupling site, for a situation with three touching objects.
Figure 29B:
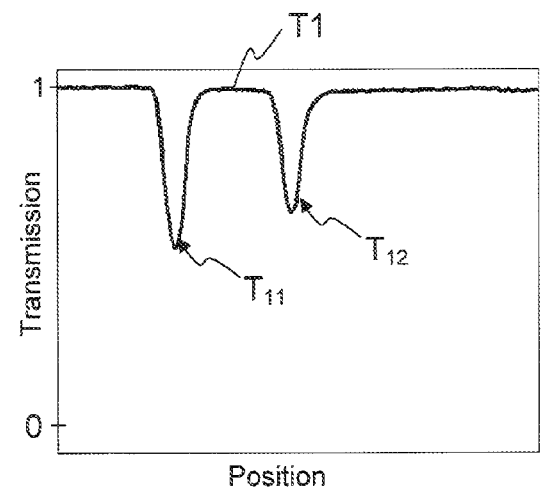

As mentioned above, if there are more than two touch points on the same scan line, the total transmission signal is the product of individual transmissions of the touch points. This is true for any number of objects on any scan line, provided that a remainder of the beam reaches the detector. Thus, by converting the measurement signals into transmission signals, it is possible to separate the contribution from individual touching objects to a peak in a transmission signal. FIG. 29A corresponds to FIG. 28A, but shows a measurement signal S1 obtained with three touching objects, where two touching objects are located on the same scan line. FIG. 29B shows that the resulting transmission signal T1 is made up of two peaks $T_{11}$ and $T_{12}$, wherein the magnitude of peak $T_{11}$ represents the product of the transmissions of two touching objects.

The skilled person realizes that the position determination may be simplified by operating on logarithms (in any base), since the logarithm of the total transmission signal is then equal to the sum of the logarithms of the individual transmission signals: $\log T_{ij} = \Sigma \log t_n$. However, logarithms need not be used.

In step 66, the touch locations are determined based on the transmission signals. The touch-sensing systems as described herein may be modeled using known algorithms developed for transmission tomography with a parallel scanning geometry. Thus, the touch locations may be reconstructed using any available image reconstruction algorithm, especially few-view algorithms that are used in, e.g., the field of tomography. The reconstruction may also take into account a predetermined functional dependence between signal width and position along the panel, caused by scattering in the system (see below).

The determination of touch locations in step 66 may thus involve identifying peaks in the transmission signals, while possibly also separating adjacent/overlapping peaks (cf. FIG. 1A); reconstructing the beams that correspond to the identified peaks, and identifying candidate intersections between the reconstructed beams in the sensing area; computing an area value indicative of the (logarithmic) integrated area under each identified peak in the transmission signals, and setting up an equation system relating the candidate intersections to the area values; and then using e.g. linear programming to identify the most likely set of touches from the set of candidates. The accuracy and/or computation speed of step 66 may be increased by using a priori knowledge about the touch locations, e.g. by using information about the touch locations that were identified during preceding sensing instance(s).

To give a simplified example, based on the measurement/transmission signals in FIG. 1A, the peaks in signal S1 may yield logarithmic areas a1, a2 and the peak in S2 may yield logarithmic area a3. Beam reconstruction may yield two intersections p1, p2, giving the equation system:

$$\begin{cases} p1 = a1 \\ p2 = a2 \\ p1 + p2 = a3 \end{cases}$$

In this particular example, the solution is trivial, but it should be realized that the provision of multiple touches and comparatively few beam sweeps may result in an equation system that has a number of possible solutions, or no solution, requiring the use of optimization methodology to derive the most likely set of touches.

After step 66, the determined touch locations are output and the method returns to step 60 for processing of a forthcoming sensing instance.

The above-mentioned data processor typically comprises a set of elements or means for executing different processing steps in the above-described decoding process. The data processor may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc., as well as one or more data acquisition devices, such as an A/D converter. The special-purpose software may be provided to the computing device on any suitable computer-readable medium, including a record medium, a read-only memory, or an electrical carrier signal.

Influence of Scattering

In a system with negligible scattering, the fraction of energy lost in the interaction with an object is independent of the object's distance to the detector. This means that a transmission signal detected on a detector will be independent of location of the object along the main direction of a beam.

Figure 30:
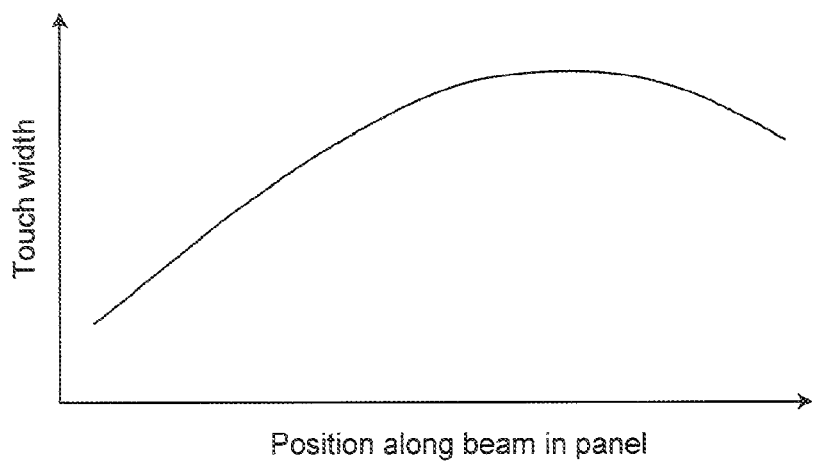
FIG. 30 is a graph of signal width as a function of touch location along a beam in a panel with a scattering surface.

If scattering is present in the system, the transmission signal of an object will depend on the location of the object along the main direction of a beam. Scattering is primarily caused by the beam being scattered each time it is reflected internally against the surfaces of the panel. This causes the beam to be broadened in the plane of the panel as the beam travels from the injection site through the panel. Thus, for each internal reflection, some radiation is diverted away from the main direction of the beam, and the centre of the beam looses energy with distance. Another effect is that scattered radiation from the broadened beam re-enters the beam behind a touching object. This effect is dependent on the distance between the object and the detector. The combined effects of broadening and re-entry generate a functional dependence between the signal width (cf. w1 and W1 in FIG. 1A) in the measurement signal and the distance between the detector and the touching object. FIG. 30 illustrates an example of such a functional dependence, i.e. the measured signal width as a function of position along the beam for an object with a given size (width). Clearly, the measurement signals (e.g. S1, S2) will contain additional distance information, via the functional dependence. If the functional dependence is known or approximated, the additional distance information is the measurement signals may be utilized to facilitate and/or improve the position determination. The use of this functional dependence is further described in U.S. provisional application No. 61/202,208, filed on Feb. 5, 2009, which is incorporated herein by this reference.

Scattering is particularly noticeable if an anti-glare surface/layer is provided on one or both of the panel surfaces. The anti-glare surface/layer provides a diffusing structure which may enhance the scattering of the beam for each internal reflection, and which may also cause radiation to escape through the surface for each internal reflection. Thus, the provision of an anti-glare surface/layer generally increases the broadening of the beam with distance from the injection site. This will cause the above-mentioned transmission signal to depend on the distance between emitter and object as discussed above and indicated in FIG. 30.

The use of an anti-glare surface/layer may be advantageous to reduce glares from external lighting on the surface of the panel. Such glares might otherwise impair the ability of an external observer to view any information provided on the panel by the interface device (6 in FIG. 1A). Furthermore, when the touching object is a naked finger, the contact between the finger and the panel normally leaves a finger print on the surface. On a perfectly flat surface, such finger prints are clearly visible and usually unwanted. By adding an anti-glare surface/layer to the surface, the visibility of fingerprints is reduced. Furthermore, the friction between finger and panel decreases when an anti-glare is used, thereby improving the user experience. Anti-glares are specified in gloss units (GU), where lower GU values result in less glares. In one embodiment, the touch surface(s) of the panel has a GU value of 10-200, preferably 100-120.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the beams need not be swept in a pure translation movement across the panel. For example, the angle of each beam to the normal of its sweep direction may vary during the sweep. Such variations may be intentional or unintentional. Unintentional variations may be caused by inaccuracies in the input scanner arrangement, e.g. in the beam scanner or the beam-directing element (12A, 12B in FIG. 18A). Generally, unintentional angle variations do not exceed ±2°. Intentional variations may be included to provide certain properties in certain parts of the panel. Suitably, the variations are controlled so as to maintain the beam angles within given design limits in at least part of the sensing area. In a special case of intentional variations, these variations are controlled such that essentially constant mutual angles are maintained within at least part of the sensing area. Generally, as long as the variations are known, e.g. via a calibration procedure, they can be accounted for in the reconstruction of the beams performed by the data processor.

It should also noted that any one of the beam arrangements described in the foregoing may be combined with further beams that do not comply with any one of the above design principles. For example, a set of equiangular beams may be combined with one or more further beams that are non-equiangular with the set of equiangular beams. It is also possible to combine any one of the beam arrangements described in the foregoing, e.g. a v-scan with a Ψ-scan, equiangular beams with one or more v-scans or Ψ-scans, etc.

Although the description has been focused on the use of swept beams inside a panel for multi-touch detection, it should be understood that the above-described decoding process, including the calculation and use of transmission signals, is equally applicable when the panel is internally illuminated by "static" sheets of light, i.e. a sheet in which all light rays are emitted concurrently, wherein each sheet results in a measurement signal. Further, the decoding process may be used to determine the location of a single touching object, based on two or more measurement signals, e.g. resulting from a single v-scan or the beam arrangement shown in FIG. 1.

The invention claimed is:

1. A method for detecting a location of at least one object on a touch surface on a radiation transmissive panel, said method comprising:

obtaining at least two output signals from a detection arrangement which is optically coupled to one or more elongate outcoupling sites on said radiation transmissive panel, each of said one or more elongate outcoupling sites extending along a length of an edge of said radiation transmissive panel, each of said one or more elongate outcoupling sites being configured to optically couple radiation propagating through said radiation transmissive panel out of said radiation transmissive panel to said detection arrangement, the radiation propagating through said radiation transmissive panel by internal reflection between the touch surface and an opposite surface of said radiation transmissive panel, said at least two output signals representing a respective spatial distribution of said radiation along said one or more elongate outcoupling sites;

generating at least two transmission signals, wherein said generating includes dividing said at least two output signals by a background signal; and identifying said location based on peaks in said at least two transmission signals.

2. The method of claim 1, wherein said identifying comprises:

identifying a radiation path for each peak in said at least two transmission signals; and identifying intersection points for the identified radiation paths.

3. The method of claim 2, wherein said identifying further comprises:

calculating an integrated area under each peak in said at least two transmission signals; and solving an equation system that relates each integrated area to at least one of said intersection points.

4. The method of claim 1, wherein said generating further comprises:

operating a logarithmic function on the result of said dividing.

5. The method of claim 1, wherein the background signal represents the spatial distribution of radiation along said one or more elongate outcoupling sites without said at least one object on the touch surface.

6. The method of claim 1, wherein the background signal is pre-set, derived during a separate calibration step, or derived from one or more preceding output signals.

7. The method of claim 1, wherein each spatial distribution originates from a respective beam of radiation, which is introduced into the radiation transmissive panel to propagate by internal reflection between the touch surface and the opposite surface of the radiation transmissive panel in a respective main direction, such that each beam is received at said one or more elongate outcoupling sites.

8. A non-transitory computer-readable storage medium storing computer-executable instructions that, when executed on a data-processing system, cause the data-processing system to carry out the method of claim 1.

9. A device for detecting a location of at least one object on a touch surface on a radiation transmissive panel, said device comprising:

a data processor configured to, obtain at least two output signals from a detection arrangement which is optically coupled to one or more elongate outcoupling sites on said radiation transmissive panel, each of said one or more elongate outcoupling sites extending along a length of an edge of said radiation transmissive panel, each of said one or more elongate outcoupling sites being configured to optically couple radiation propagating through said radiation transmissive panel out of said radiation transmissive panel to said detection arrangement, the radiation propagating through said radiation transmissive panel by internal reflection between the touch surface and an opposite surface of said radiation transmissive panel, said at least two output signals representing a respective spatial distribution of said radiation along said one or more elongate outcoupling sites;

generate at least two transmission signals, wherein said generating includes dividing said at least two output signals by a background signal, and identify said location of the at least one object based on peaks in said at least two transmission signals.

* * * * *